US012609646B2

(12) United States Patent
Mazda et al.

(10) Patent No.: US 12,609,646 B2
(45) Date of Patent: Apr. 21, 2026

(54) BOOSTED CONVERTER FOR PULSED ELECTRIC MACHINE CONTROL

(71) Applicant: Tula eTechnology, Inc., San Jose, CA (US)

(72) Inventors: Babak Mazda, Los Altos, CA (US); Adya S. Tripathi, San Jose, CA (US); Paul Carvell, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 233 days.

(21) Appl. No.: 18/514,489

(22) Filed: Nov. 20, 2023

(65) Prior Publication Data

US 2024/0136968 A1 Apr. 25, 2024

Related U.S. Application Data

(63) Continuation of application No. 17/166,646, filed on Feb. 3, 2021, now Pat. No. 11,863,096, which is a continuation of application No. 16/818,570, filed on Mar. 13, 2020, now Pat. No. 10,944,352, which is a continuation of application No. PCT/US2020/022262, filed on Mar. 12, 2020, and a continuation-in-part of application No. 16/353,166, filed on Mar. 14, 2019, now Pat. No. 10,742,155.

(60) Provisional application No. 62/819,097, filed on Mar. 15, 2019, provisional application No. 62/810,861, filed on Feb. 26, 2019, provisional application No. 62/658,739, filed on Apr. 17, 2018, provisional application No. 62/644,912, filed on Mar. 19, 2018.

(51) Int. Cl.
$H02P\ 27/08$ (2006.01)

(52) U.S. Cl.
CPC ........ *H02P 27/085* (2013.01); *H02P 2201/09* (2013.01)

(58) Field of Classification Search
CPC .. H02P 27/085; H02P 23/0027; H02P 25/022; H02P 2201/09; B60L 15/20
See application file for complete search history.

(56) References Cited

U.S. PATENT DOCUMENTS

| | | |
|---|---|---|
| 4,441,043 A | 4/1984 | Decesare |
| 4,989,146 A | 1/1991 | Imajo |
| | (Continued) | |

FOREIGN PATENT DOCUMENTS

| | | |
|---|---|---|
| CN | 1829070 A | 9/2006 |
| CN | 102381265 A | 3/2012 |
| | (Continued) | |

OTHER PUBLICATIONS

Phillips, U.S. Appl. No. 18/305,776, filed Apr. 24, 2023.
(Continued)

*Primary Examiner* — Thai T Dinh
(74) *Attorney, Agent, or Firm* — Beyer Law Group LLP

(57) ABSTRACT

A boost circuit is arranged to reduce rise and fall times of pulsed power used for pulsed control operation of electric machines. Magnetic energy present in the electric machine at the end of a pulse is extracted by the boost circuit to reduce the pulse fall time. The energy is stored by the boost circuit and then applied at the beginning of a subsequent pulse to reduce the rise time. By reducing rise and fall times compared to not using such a boost circuit, machine efficiency is improved.

32 Claims, 15 Drawing Sheets

(56) References Cited

U.S. PATENT DOCUMENTS

| | | | |
|---|---|---|---|
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,640,073 A | 6/1997 | Ikeda et al. | |
| 5,701,062 A | 12/1997 | Barrett | |
| 5,731,669 A | 3/1998 | Shimizu et al. | |
| 6,121,740 A | 9/2000 | Gale et al. | |
| 6,291,960 B1 | 9/2001 | Crombez | |
| 6,308,123 B1 | 10/2001 | Ikegaya et al. | |
| 6,370,049 B1 | 4/2002 | Heikkila | |
| 6,424,799 B1 | 7/2002 | Gilmore | |
| 6,483,218 B1 | 11/2002 | Petrinko | |
| 6,493,204 B1 | 12/2002 | Glidden et al. | |
| 6,605,912 B1 | 8/2003 | Bharadwaj et al. | |
| 6,829,515 B2 | 12/2004 | Grimm | |
| 6,829,556 B2 | 12/2004 | Kumar | |
| 6,906,485 B2 | 6/2005 | Hussein | |
| 6,940,239 B2 | 9/2005 | Iwanaga et al. | |
| 6,984,946 B2 | 1/2006 | Donnelly et al. | |
| 7,190,143 B2 | 3/2007 | Wei et al. | |
| 7,259,664 B1 | 8/2007 | Cho et al. | |
| 7,327,545 B2 | 2/2008 | Konishi | |
| 7,411,801 B2 | 8/2008 | Welchko et al. | |
| 7,453,174 B1 | 11/2008 | Kalsi | |
| 7,558,655 B2 | 7/2009 | Garg et al. | |
| 7,577,511 B1 | 8/2009 | Tripathi et al. | |
| 7,616,466 B2 | 11/2009 | Chakrabarti et al. | |
| 7,768,170 B2 | 8/2010 | Tatematsu et al. | |
| 7,852,029 B2 | 12/2010 | Kato et al. | |
| 7,960,888 B2 | 6/2011 | Ai et al. | |
| 7,969,341 B2 | 6/2011 | Robbe et al. | |
| 8,020,651 B2 | 9/2011 | Zillmer et al. | |
| 8,099,224 B2 | 1/2012 | Tripathi et al. | |
| 8,744,656 B2 | 6/2014 | Sato et al. | |
| 8,768,563 B2 | 7/2014 | Nitzberg et al. | |
| 8,773,063 B2 | 7/2014 | Nakata | |
| 8,841,876 B2 | 9/2014 | Leaver et al. | |
| 9,046,559 B2 | 6/2015 | Lindsay et al. | |
| 9,050,894 B2 | 6/2015 | Banerjee et al. | |
| 9,308,822 B2 | 4/2016 | Matsuda | |
| 9,495,814 B2 | 11/2016 | Ramesh | |
| 9,512,794 B2 | 12/2016 | Serrano et al. | |
| 9,630,614 B1 | 4/2017 | Hill et al. | |
| 9,702,420 B2 | 7/2017 | Yoon | |
| 9,758,044 B2 | 9/2017 | Gale et al. | |
| 9,948,173 B1 | 4/2018 | Abu Qahouq | |
| 9,954,474 B2 | 4/2018 | Pietromonaco | |
| 10,060,368 B2 | 8/2018 | Pirjaberi et al. | |
| 10,081,255 B2 | 9/2018 | Yamada et al. | |
| 10,256,680 B2 | 4/2019 | Hunstable | |
| 10,273,894 B2 | 4/2019 | Tripathi | |
| 10,291,168 B2 * | 5/2019 | Fukuta | H02P 27/085 |
| 10,291,174 B2 | 5/2019 | Irie et al. | |
| 10,320,249 B2 | 6/2019 | Okamoto et al. | |
| 10,340,821 B2 | 7/2019 | Magee et al. | |
| 10,344,692 B2 | 7/2019 | Nagashima et al. | |
| 10,381,968 B2 * | 8/2019 | Agirman | H02M 7/5395 |
| 10,476,421 B1 * | 11/2019 | Khalil | H02P 25/0805 |
| 10,550,776 B1 | 2/2020 | Leone et al. | |
| 10,742,155 B2 | 8/2020 | Tripathi | |
| 10,763,772 B1 | 9/2020 | Fatemi et al. | |
| 10,944,352 B2 * | 3/2021 | Mazda | H02P 21/02 |
| 11,077,759 B1 | 8/2021 | Srinivasan | |
| 11,088,644 B1 * | 8/2021 | Carvell | H02P 27/085 |
| 11,133,763 B1 | 9/2021 | Islam | |
| 11,133,767 B2 | 9/2021 | Serrano et al. | |
| 11,167,648 B1 * | 11/2021 | Carvell | H02P 21/0025 |
| 11,228,272 B2 * | 1/2022 | Tripathi | H02P 27/08 |
| 11,345,241 B1 | 5/2022 | Cai | |
| 11,427,177 B2 | 8/2022 | Serrano et al. | |
| 11,557,996 B1 | 1/2023 | Arvanitis | |
| 11,623,529 B2 | 4/2023 | Carvell et al. | |
| 11,626,827 B2 | 4/2023 | Tripathi | |
| 11,628,730 B2 | 4/2023 | Srinivasan | |
| 11,637,513 B2 | 4/2023 | Phillips et al. | |
| 11,673,476 B2 | 6/2023 | Cai | |
| 11,695,361 B2 | 7/2023 | Carvell et al. | |
| 12,003,202 B2 | 6/2024 | Tripathi | |
| 12,206,346 B2 | 1/2025 | Carvell et al. | |
| 12,301,149 B2 | 5/2025 | Tripathi | |
| 12,319,147 B2 | 6/2025 | Srinivasan | |
| 2001/0039926 A1 | 11/2001 | Kobayashi et al. | |
| 2002/0043954 A1 | 4/2002 | Hallidy et al. | |
| 2005/0127861 A1 | 6/2005 | McMillan et al. | |
| 2005/0151437 A1 | 7/2005 | Ramu | |
| 2005/0160771 A1 | 7/2005 | Hosoito et al. | |
| 2007/0216345 A1 | 9/2007 | Kanamori | |
| 2007/0287594 A1 | 12/2007 | DeGeorge et al. | |
| 2008/0129243 A1 | 6/2008 | Nashiki | |
| 2008/0179980 A1 | 7/2008 | Dawsey et al. | |
| 2009/0045691 A1 | 2/2009 | Ichiyama | |
| 2009/0058592 A1 | 3/2009 | Leghissa et al. | |
| 2009/0121669 A1 | 5/2009 | Hanada | |
| 2009/0128072 A1 | 5/2009 | Strong et al. | |
| 2009/0146615 A1 | 6/2009 | Zillmer et al. | |
| 2009/0179608 A1 | 7/2009 | Welchko et al. | |
| 2009/0306841 A1 | 12/2009 | Miwa et al. | |
| 2010/0010724 A1 | 1/2010 | Tripathi et al. | |
| 2010/0066299 A1 | 3/2010 | Izumi et al. | |
| 2010/0201294 A1 | 8/2010 | Yuuki et al. | |
| 2010/0296671 A1 | 11/2010 | Khoury et al. | |
| 2011/0029179 A1 | 2/2011 | Miyazaki et al. | |
| 2011/0089774 A1 | 4/2011 | Kramer | |
| 2011/0101812 A1 | 5/2011 | Finkle et al. | |
| 2011/0130916 A1 | 6/2011 | Mayer | |
| 2011/0208405 A1 | 8/2011 | Tripathi et al. | |
| 2012/0056569 A1 | 3/2012 | Takamatsu et al. | |
| 2012/0112674 A1 | 5/2012 | Schulz et al. | |
| 2012/0169263 A1 | 7/2012 | Gallegos-Lopez et al. | |
| 2012/0217916 A1 | 8/2012 | Wu et al. | |
| 2012/0217921 A1 | 8/2012 | Wu et al. | |
| 2013/0002173 A1 | 1/2013 | Baglino et al. | |
| 2013/0062138 A1 | 3/2013 | Naitou et al. | |
| 2013/0119814 A1 | 5/2013 | Burch et al. | |
| 2013/0134912 A1 | 5/2013 | Khalil et al. | |
| 2013/0141027 A1 | 6/2013 | Nakata | |
| 2013/0226420 A1 | 8/2013 | Pedlar et al. | |
| 2013/0241445 A1 | 9/2013 | Tang | |
| 2013/0258734 A1 | 10/2013 | Nakano et al. | |
| 2013/0314021 A1 | 11/2013 | Yamada et al. | |
| 2014/0018988 A1 | 1/2014 | Kitano et al. | |
| 2014/0028225 A1 | 1/2014 | Takamatsu et al. | |
| 2014/0130506 A1 | 5/2014 | Gale et al. | |
| 2014/0176034 A1 | 6/2014 | Matsumura et al. | |
| 2014/0217940 A1 | 8/2014 | Kawamura | |
| 2014/0265957 A1 | 9/2014 | Hu et al. | |
| 2014/0292382 A1 | 10/2014 | Ogawa et al. | |
| 2014/0354199 A1 | 12/2014 | Zeng et al. | |
| 2015/0025725 A1 | 1/2015 | Uchida | |
| 2015/0236628 A1 | 8/2015 | Wang et al. | |
| 2015/0240404 A1 | 8/2015 | Kim et al. | |
| 2015/0246685 A1 | 9/2015 | Dixon et al. | |
| 2015/0261422 A1 | 9/2015 | Den et al. | |
| 2015/0297824 A1 | 10/2015 | Cabiri et al. | |
| 2015/0318803 A1 | 11/2015 | Wu et al. | |
| 2016/0114830 A1 | 4/2016 | Dixon et al. | |
| 2016/0226409 A1 | 8/2016 | Ogawa | |
| 2016/0233812 A1 | 8/2016 | Lee et al. | |
| 2016/0269225 A1 | 9/2016 | Kirchmeier et al. | |
| 2016/0373047 A1 | 12/2016 | Loken et al. | |
| 2017/0087990 A1 | 3/2017 | Neti et al. | |
| 2017/0163108 A1 | 6/2017 | Schencke et al. | |
| 2017/0331402 A1 | 11/2017 | Smith et al. | |
| 2018/0032047 A1 | 2/2018 | Nishizono et al. | |
| 2018/0045771 A1 | 2/2018 | Kim et al. | |
| 2018/0154786 A1 | 6/2018 | Wang et al. | |
| 2018/0276913 A1 | 9/2018 | Garcia et al. | |
| 2018/0323665 A1 | 11/2018 | Chen et al. | |
| 2018/0334038 A1 | 11/2018 | Zhao et al. | |
| 2019/0058374 A1 | 2/2019 | Enomoto et al. | |
| 2019/0267919 A1 | 8/2019 | Suzuki et al. | |
| 2019/0288629 A1 | 9/2019 | Tripathi | |
| 2019/0288631 A1 | 9/2019 | Tripathi | |

(56) References Cited

U.S. PATENT DOCUMENTS

| | | | |
|---|---|---|---|
| 2019/0341820 A1 | 11/2019 | Krizan et al. | |
| 2020/0212834 A1 | 7/2020 | Mazda et al. | |
| 2020/0262398 A1 | 8/2020 | Sato et al. | |
| 2020/0328714 A1 | 10/2020 | Tripathi | |
| 2020/0343849 A1 | 10/2020 | Coroban-Schramel | |
| 2020/0366223 A1 | 11/2020 | Coroban-Schramel | |
| 2021/0146909 A1* | 5/2021 | Serrano | H02P 27/16 |
| 2021/0159836 A1 | 5/2021 | Mazda et al. | |
| 2021/0203263 A1 | 7/2021 | Serrano et al. | |
| 2021/0351733 A1 | 11/2021 | Carvell | |
| 2022/0094290 A1 | 3/2022 | Carvell | |
| 2022/0234451 A1 | 7/2022 | Srinivasan | |
| 2022/0416707 A1 | 12/2022 | Chen | |
| 2023/0114289 A1 | 4/2023 | Islam et al. | |
| 2023/0219426 A1 | 7/2023 | Carvell et al. | |
| 2023/0223885 A1 | 7/2023 | Tripathi | |
| 2023/0253911 A1 | 8/2023 | Islam | |
| 2023/0283211 A1 | 9/2023 | Carvell | |
| 2023/0308040 A1 | 9/2023 | Farah et al. | |
| 2024/0022191 A1 | 1/2024 | Phillips et al. | |
| 2024/0291410 A1 | 8/2024 | Carvell et al. | |
| 2024/0372489 A1 | 11/2024 | Srinivasan | |
| 2025/0055397 A1 | 2/2025 | Chen et al. | |
| 2025/0115136 A1 | 4/2025 | Srinivasan | |
| 2025/0121701 A1 | 4/2025 | Carvell | |

FOREIGN PATENT DOCUMENTS

| | | | |
|---|---|---|---|
| CN | 2605398 A1 | 6/2013 | |
| CN | 104716754 A | 6/2015 | |
| CN | 204589885 U | 8/2015 | |
| CN | 105196877 A | 12/2015 | |
| CN | 205229379 U | 5/2016 | |
| CN | 106932208 A | 7/2017 | |
| CN | 107067780 A | 8/2017 | |
| CN | 207129052 U | 3/2018 | |
| CN | 108216026 A | 6/2018 | |
| CN | 108445386 A | 8/2018 | |
| CN | 110212725 | 9/2019 | |
| DE | 102014206342 | 10/2015 | |
| FR | 2989479 | 10/2013 | |
| GB | 2273212 | 8/1994 | |
| JP | H05153705 | 6/1993 | |
| JP | 10243680 | 9/1998 | |
| JP | 2008-079686 A | 4/2008 | |
| JP | 2009-065758 A | 3/2009 | |
| JP | 2010119216 | 5/2010 | |
| JP | 2011-67043 | 3/2011 | |
| JP | 2012-55029 | 3/2012 | |
| JP | 2012-228134 | 11/2012 | |
| JP | 5165660 B2 | 12/2012 | |
| JP | 2014-033449 A | 2/2014 | |
| JP | 5857472 B2 | 12/2015 | |
| JP | 2017-011970 A | 1/2017 | |
| JP | 2017-200382 | 11/2017 | |
| JP | 2018-033250 A | 3/2018 | |
| JP | 2020048254 A | 3/2020 | |
| JP | 2022/020123 | 2/2022 | |
| KR | 10-2013-0095773 | 8/2013 | |
| KR | 10-2017-0021146 A | 2/2017 | |
| KR | 10-2017-0032976 A | 3/2017 | |
| KR | 10-2017-0060041 | 5/2017 | |
| WO | WO03/36787 A1 | 5/2003 | |
| WO | WO2012-010993 A2 | 1/2012 | |

OTHER PUBLICATIONS

Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.
Cai et al., "Torque Ripple Reduction for Switched Reluctance Motor with Optimized PWM Control Strategy", https://www.mdpi.com/1996-1073/11/11/3215, Oct. 15, 2018, 27 pages.
Spong et al., "Feedback Linearizing Control of Switched Reluctance Motors", IEEE Transactions on Automatic Control, vol. AC-32, No. 5, May 1987, pp. 371-379.
Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pages DS3c. 10 1, XP032311951, DOI: 10.1109/EPEPEMC.2012.6397346, ISBN: 978-1-4673-1970.6.
Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.
Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.
Carvell et al., U.S. Appl. No. 18/589,010, filed Feb. 27, 2024.
Carvell, U.S. Appl. No. 18/630,634, filed Apr. 9, 2024.

* cited by examiner

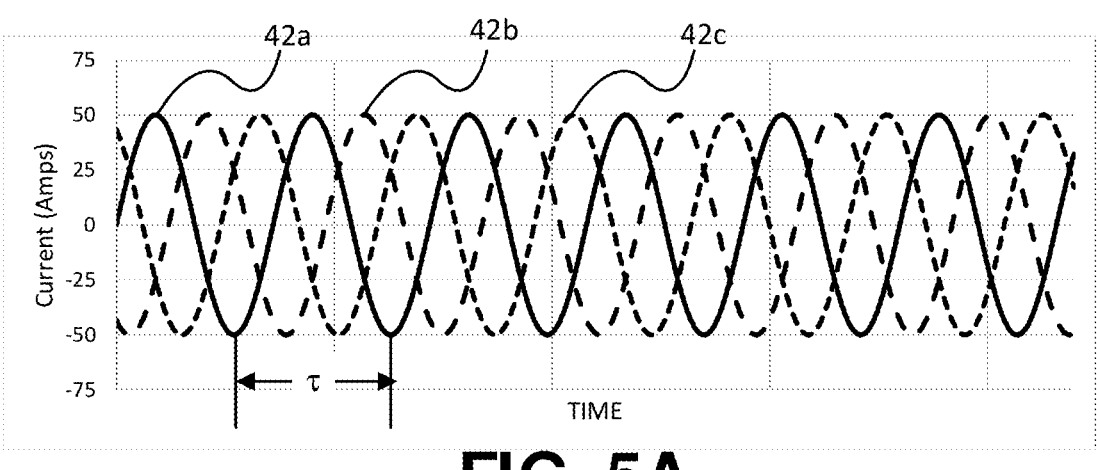
FIG. 5A
FIG. 5B
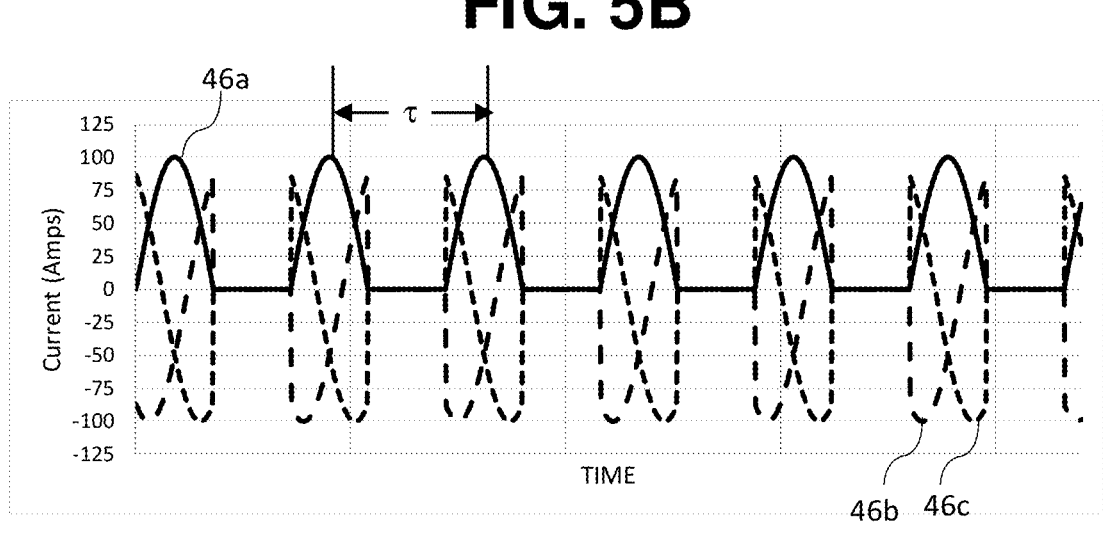
FIG. 5C

PRIOR ART

BOOSTED CONVERTER FOR PULSED ELECTRIC MACHINE CONTROL

CROSS-REFERENCE TO RELATED APPLICATIONS

This application is a continuation of U.S. application Ser. No. 17/166,646 filed Feb. 3, 2021, which is a continuation of U.S. application Ser. No. 16/818,570, filed on Mar. 13, 2020 (now U.S. Pat. No. 10,944,352, issued Feb. 17, 2021), which claims priority of U.S. Provisional Application No. 62/819,097, filed on Mar. 15, 2019. U.S. application Ser. No. 16/818,570 is a Continuation-in-Part of U.S. application Ser. No. 16/353,166 filed Mar. 14, 2019 (now U.S. Pat. No. 10,742,155, issued on Aug. 11, 2020), which claims priority to U.S. Provisional Application Serial Nos.: 62/810,861 filed Feb. 26, 2019; U.S. Provisional Application Ser. No. 62/658, 739 filed Apr. 17, 2018; and U.S. Provisional Application Ser. No. 62/644,912 filed Mar. 19, 2018. U.S. application Ser. No. 16/818,570 is further a Continuation of International Application No. PCT/US20/22262, filed Mar. 12, 2020. Each of the above listed provisional and non-provisional applications are incorporated by reference herein for all purposes.

BACKGROUND OF THE INVENTION

The present application relates generally to pulsed control of electric machines to selectively deliver a desired output in a more energy efficient manner, and more particularly, to a boosted converter circuit with improved rise and fall times for pulsing the electric machine.

The term "machine" as used herein is intended to be broadly construed to mean both electric motors and generators. Electric motors and generators are structurally very similar. Both include a stator having a number of poles and a rotor. When a machine is operating as a motor, it converts electrical energy into mechanical energy. When operating as a generator, the machine converts mechanical energy into electrical energy.

Electric machines can operate using either direct current (DC) or alternating current (AC).

Representative DC machines include brushless, electrically excited, permanent magnet, series wound, shunt, brushed, compound, and others.

With AC machines, there are two general varieties, asynchronous and synchronous. An example of an asynchronous electric machine is a three-phase induction motor.

Modern electric machines have relatively high energy conversion efficiencies. The energy conversion efficiency of most electric machines, however, can vary considerably based on their operational load. With many applications, a machine is required to operate under a wide variety of different operating load conditions. As a result, machines typically operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near is most efficient operating point, i.e. its "sweet spot". Outside these ranges, the operation of electric machine is less efficient. As driving conditions change, the machine transitions between high and low operating efficiency levels as the rotor speed and/or torque changes. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous.

A need therefore exists to operate electric machines, such as motors and generators, at higher levels of efficiency.

SUMMARY OF THE INVENTION

The present application is directed toward pulsed control of electric machines, such as motors and generators, to improve operational efficiency. In a non-exclusive embodiment, such a pulsed-controlled machine includes a power supply, a stator with windings, a rotor of design dependent upon the motor topology, a machine controller configured to selectively operate the machine in a pulsed mode, and a power converter coupled between the power supply and the electric machine. The power converter is arranged to provide pulsed input power to the windings of the stator of the machine in response to the machine controller. In addition, the power converter may include a boost circuit. The boost circuit is arranged to reduce rise and fall times of the pulsed power relative to the rise and fall times of the pulsed power without the boost circuit. The boost circuit extracts at least some of a magnetic energy present in the electric machine at the end of a pulse to reduce the pulse fall time, stores at least some of the energy, and applies at least some of the energy at the beginning of a subsequent pulse to reduce the rise time. By reducing the rise and fall times of the pulsed power, the efficiency of the electric machine and overall electrical system is improved.

BRIEF DESCRIPTION OF THE DRAWINGS

The invention and the advantages thereof, may best be understood by reference to the following description taken in conjunction with the accompanying drawings in which:

FIG. 5A is a diagrammatic representation of a continuous three-phase AC waveform having a peak value of 50 Amperes.

FIGS. 5B and 5C are pulsed waveforms having a 50% duty cycle that provide the same power output as the continuous waveform of FIG. 5A.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
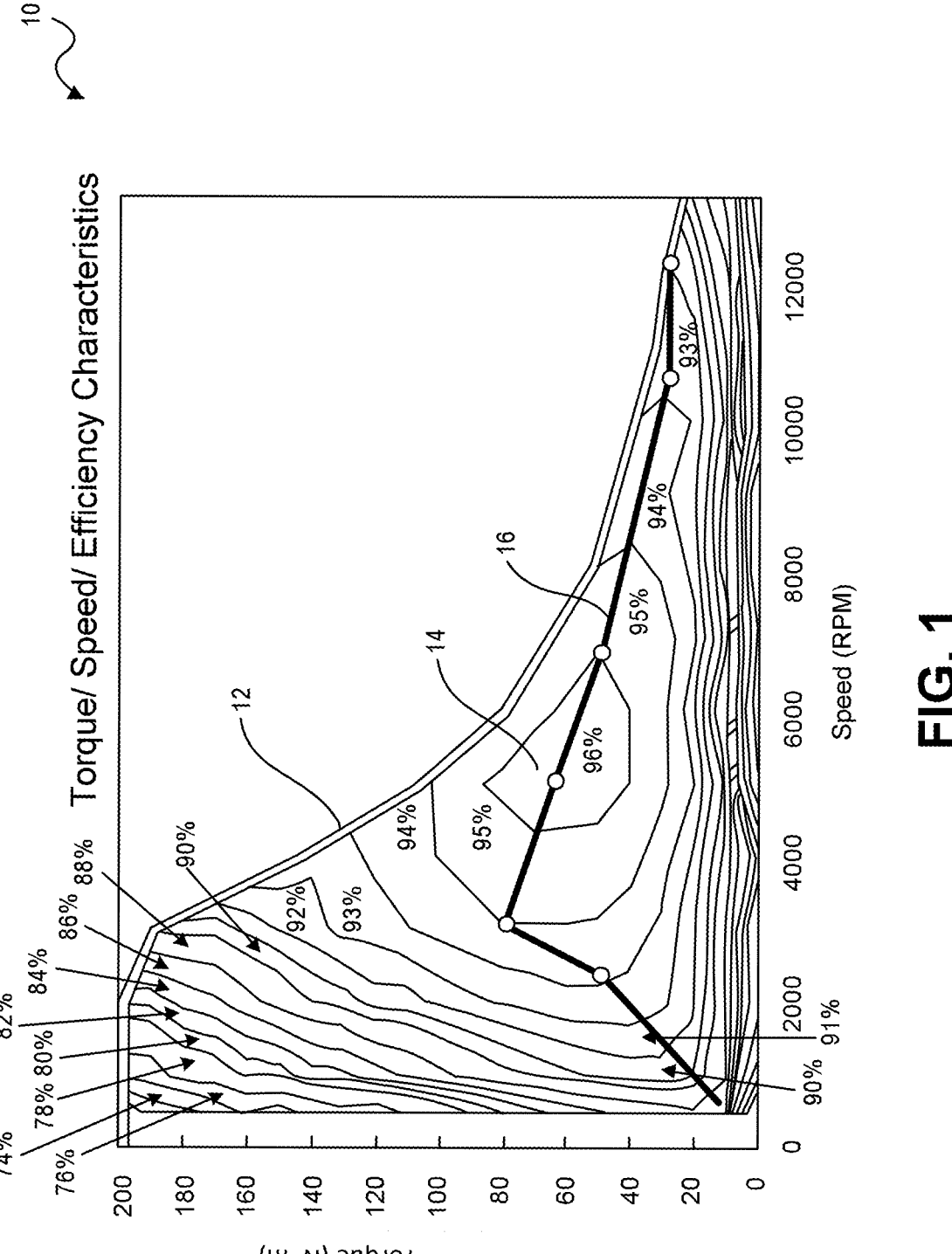
FIG. 1 is a representative Torque/Speed/Efficiency graph illustrating the energy conversion efficiency of a representative electric motor under different operating conditions.

The present application relates generally to pulsed control of a wide variety of electric machines (e.g., electric motors and generators) that would otherwise be operated in a continuous manner. By pulsed control, the machine is intelligently and intermittently pulsed on and off to both (1) meet operational demands while (2) improving overall efficiency. More specifically, under selected operating conditions, an electric machine is intermittently pulse-driven at more efficient energy conversion operating levels to deliver the desired average output more efficiently than would be attained by conventional continuous machine operation. Pulsed operation results in deliberate modulation of the electric machine torque; however, the modulation is managed in such a manner such that levels of noise or vibration are minimized for the intended application.

For the sake of brevity, the pulsed control of a wide variety of electric machines as provided herein is described in the context of a three-phase induction electric motor in a vehicle. This explanation, however, should not be construed as limiting in any regard. On the contrary, the pulse control as described herein can be used for many types of electric machine, meaning both electric motors and generators. For instance, the machine pulsed control as described herein may be used with any type of machine regardless if AC (e.g., induction, synchronous, any number of poles, etc.) or DC (e.g., brushless, electrically excited, permanent magnet, series wound, shunt brushed, compound, etc.). In addition, pulsed control of such electric machines may be used in any application, not just limited to electric vehicles. In particular, pulsed control may be used in systems that require lower acceleration and deceleration rates than vehicle applications, such as electric motors for heating, cooling, and ventilating systems.

Pulsed engine control is described in U.S. patent application Ser. No. 16/353,159 filed on Mar. 14, 2019, and U.S. Provisional Patent Application Nos.: 62/644,912, filed on Mar. 19, 2018; 62/658,739, filed on Apr. 17, 2018; and 62/810,861 filed on Feb. 26, 2019. Each of the foregoing applications is incorporated herein by reference in their entirety.

Three-Phase Induction Machine

An induction machine includes two main components, a stationary stator and a rotating rotor. In a three-phase machine, the stator may include a three-coil winding that is excited by a three-phase AC input. When the three-phase AC input is passed through the three-phase winding, a rotating magnetic field (RMF) is generated. The rotational rate of the RMF is known as the synchronous speed $(N_s)$ of the electric machine. The rotor is typically either a "squirrel cage" or a "wound" type rotor, both having a plurality of electrically conductive elements that are electrically shorted at their ends. In accordance with Faraday's law, the RMF induces a current within the conductive elements of the rotor. The induced current establishes an induced magnetic field, which interacts with the magnetic field produced in the stator coils. The interaction of the rotor and stator magnetic fields generates an electromagnetic force (EMF) causing the rotor rotation. This type of motor is called an induction motor because electrical current is induced on the rotor conductive elements by electromagnetic induction, as opposed to a direct electrically conductive path.

Three-phase induction motors provide a number of advantages. First, they are inherently self-starting. Second, the rotational speed of the rotor is easy to control. The rotational speed of the rotor $(N_r)$ is always slightly less than the synchronous speed $(N_s)$. This difference is known as slip, which may be expressed in terms of a percentage:

$$\text{Slip } \% = (N_s - N_r)/N_s \qquad \text{Eq. (1)}$$

The frequency of the three-phase AC power energizing the stator windings controls the RMF rotational rate and thus the synchronous frequency. In turn, the rotational speed of the rotor can be controlled based on Eq. (1) defined above.

While the frequency provided to the three-phase winding controls the synchronous speed $(N_s)$, the amplitude of the applied AC controls the output torque of the electric machine. When the amplitude is higher or lower, the output of the machine is higher or lower, respectively.

Vehicle Motor Efficiency Map

Referring to FIG. 1, an exemplary vehicle motor efficiency map 10 under different load and speed conditions is illustrated. The map 10 plots torque (N*m) along the vertical axis as a function of motor speed (RPM) along the horizontal axis. The maximum steady-state output power is given by curve 12.

The area under the peak-torque/speed curve 12 is mapped into a plurality of regions, each labeled by an operational efficiency percentage. For the particular motor shown, the following characteristics are evident:

The most efficient or "sweet-spot" region of its operating range is the operating region labeled 14, which is generally in the range of 4,500-6,000 RPM with a torque output in the range of about 40-70 N*m. In region 14, the energy conversion efficiency is on the order of 96%, making it the "sweet spot", where the motor is operating in its most efficient operating range.

As the motor speed increases beyond approximately 6,000+ RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular motor speed, there will be a corresponding most efficient output torque, which is diagrammatically illustrated by a maximum efficiency curve 16.

The map 10 as illustrated was derived from an electric motor used in a 2010 Toyota Prius. Map 10 is for an internal permanent magnet synchronous motor. It should be understood that this map 10 is merely illustrative and should not be construed as limiting in any regard. A similar map can be generated for just about any electric motor, for example a 3-phase induction motor, regardless if used in a vehicle or in some other application.

As can be seen from the map 10, the motor is generally most efficient when operating within the speed and torque ranges of the sweet spot 14. If the operating conditions can be controlled so that the motor operates a greater proportion of time at or near its sweet spot 14, the overall energy conversion efficiency of the motor can be significantly improved.

From a practical point of view, however, many driving situations dictate that the motor operate outside of the speed and torque ranges of the sweet spot 14. In electric vehicles it is common to have no transmission and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As can be seen in FIG. 1, at any particular motor speed, there will be a corresponding most efficient output torque which is diagrammatically illustrated by maximum efficiency curve 16. From a conceptual standpoint, when the desired motor torque is below the most efficient output torque for the current motor speed, the overall efficiency of the motor can be improved by pulsing the motor, so as to operate the motor a proportion of time at or near its sweet spot and the remainder of the time at a low or zero torque output level. The average torque thus generated is controlled by controlling the duty cycle of sweet spot operation.

Figure 2:
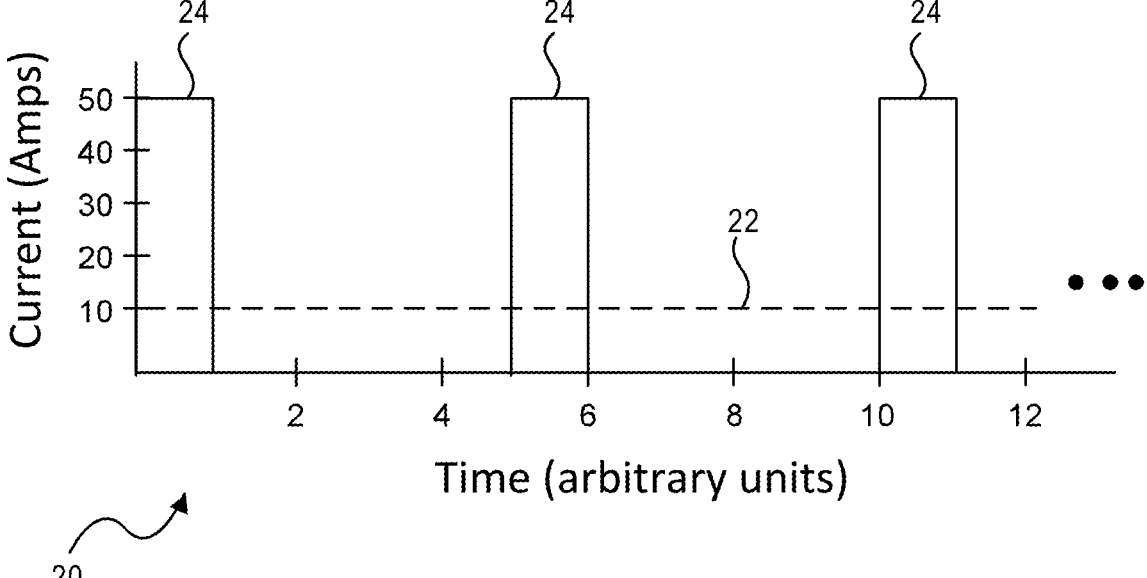
FIG. 2 is a graph illustrating a pulsed current signal applied to an electric motor.

Referring to FIG. 2, a graph 20 plotting total applied current to an electric motor on the vertical axis versus time on the horizontal axis is illustrated. The applied current may be the sum of the current on all three-phases for a three-phase motor. For illustrative purposes, it will be assumed that each ampere of applied current will produce 1 N*m of output torque. In this particular example, a desired motor output torque is 10 N*m, which will require 10 amps of current as represented by the dashed line 22. In this example, the most efficient torque output for the motor is 50 N*m corresponding to 50 amps of applied current.

During conventional operation, the motor would continuously generate 10 N*m so long as the desired torque remained at this value. With pulsed-control operation, the motor is pulsed, as represented by pulses 24, to deliver 50

N*m of torque for 20% of the time. The remaining 80% of the time, the motor is off. The net output of the motor therefore meets the operational demand of 10 N*m. Since the motor operates more efficiently when it is delivering 50 N*m than when it delivers 10 N*m, the motor's overall efficiency can thus be improved by pulsing the motor using a 20% duty cycle while still meeting the average torque demand.

In the above example, the duty cycle is not necessarily limited to 20%. As long as the desired motor output, does not exceed 50 N*m, the desired motor output can be met by changing the duty cycle. For instance, if the desired motor output changes to 20 N*m, the duty cycle of the motor operating at 50 N*m can be increased to 40%; if the desired motor output changes to 40 N*m, the duty cycle can be increase to 80%; if the desired motor output changes to 5 N*m, the duty cycle can be reduced to 10% and so on. Generally, pulsed motor control can potentially be used advantageously any time that the desired motor torque falls below the maximum efficiency curve 16 of FIG. 1.

On the other hand, when the desired motor torque is at or above the maximum efficiency curve 16, the motor may be operated in a conventional (continuous or non-pulsed) manner to deliver the desired torque. Pulsed operation offers opportunity for efficiency gains when the motor is required to deliver an average torque below the average torque corresponding to its maximum operating efficiency point.

It should be noted that current and torque values and time scale provided in FIG. 2 are merely illustrative and are not intended to be limiting in any manner. In actual motor pulsing embodiments, the pulse duration used may widely vary based on the design needs of any particular system. In generally, however, the scale of the periods for each on/off cycle is expected to be on the order of 10 μsec to 0.10 seconds (i.e. pulsing at a frequency in the range of 10 to 100,000 Hz), as for example between 0.2 and 20 milliseconds (50 to 5000 Hz) as will be discussed in more detail below. Furthermore, there are a wide variety of different motors and each motor has its own unique efficiency characteristics. Further, at different motor speeds, a given motor will have a different efficiency curve. The nature of the curve may vary depending on the particular motor or a particular application. For example, the current pulses need not be flat topped as depicted in FIG. 2 and/or the current need not go to zero during the off periods but may be some non-zero value. Regardless of the particular curve used, however, at some proportion of the time the motor is operating is preferably at or near its highest efficiency region for a given motor speed.

Efficiency Improvements with Improved Rate of Torque Rise

The vast majority of current motor converters are typically designed for continuous, not pulsed operation. Such motors generally transition from the unenergized to an energized state relatively infrequently. As a result, little design effort is made in managing such transitions. To the extent any design effort is made in managing the transition, it is typically directed to achieving a smooth transition as opposed to a fast transition. The transition from the energized to energized states for most motors is therefore often rate limited (i.e., relatively not fast).

Figure 3A:
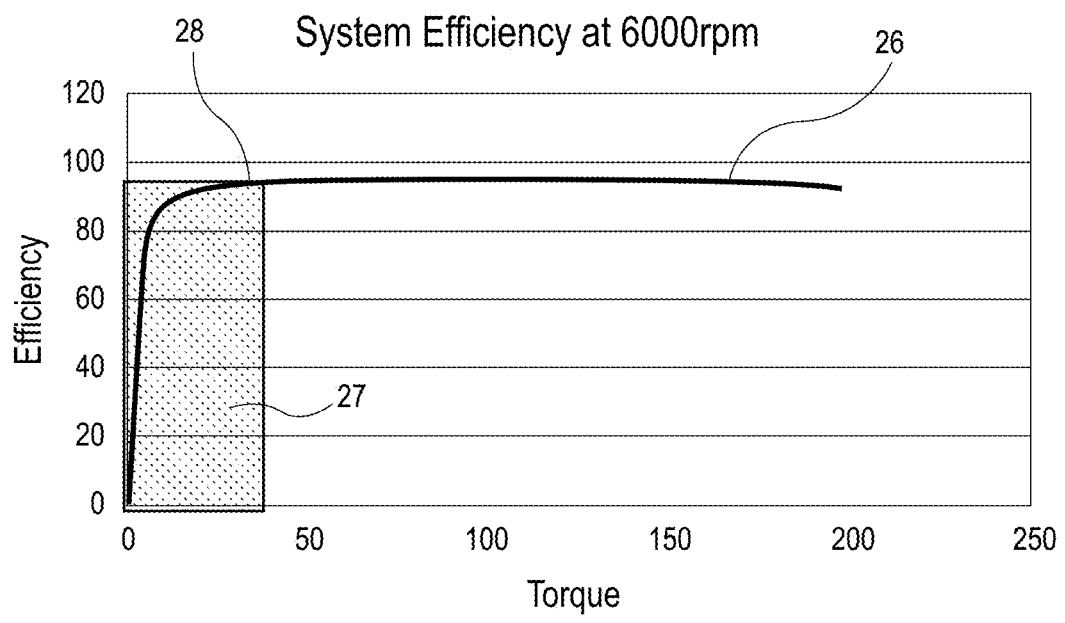
FIG. 3A is a torque versus efficiency map for a motor operating at a fixed speed during a transition from zero to peak efficiency torque.
Figure 3B:
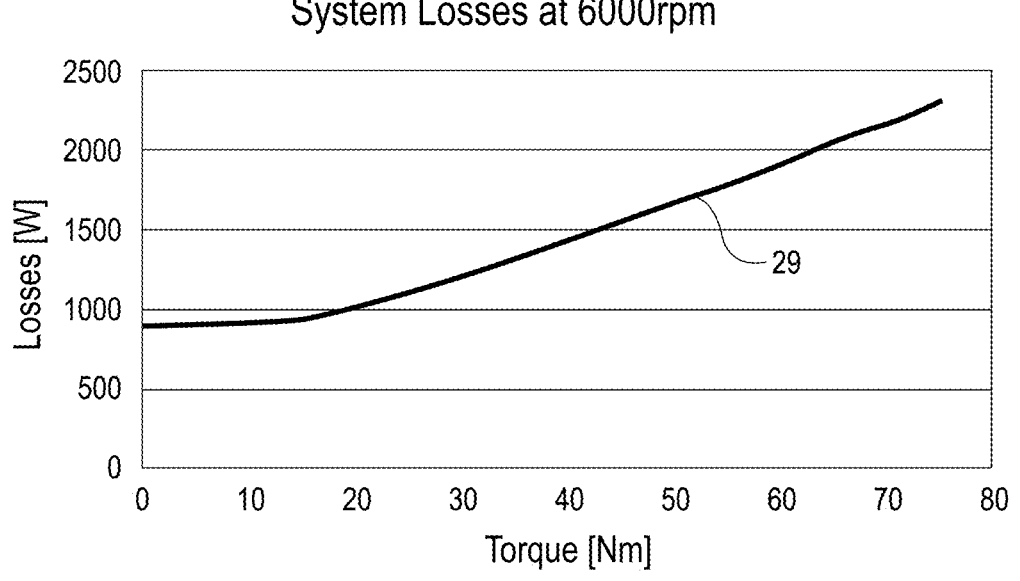
FIG. 3B is a torque versus work lost for an exemplary motor operating at a fixed speed during a transition from zero to peak efficiency torque.

The Applicant has discovered that for a motor system that regularly transitions from an unenergized motor state to peak efficiency state such as with pulsed operation, even further efficiency improvements can be realized when the transitions occur as fast as possible. With fast transitions, for example from zero torque to the peak efficiency torque, the overall average motor efficiency is improved because the motor spends less time in transition where efficiency is less than the peak. This relationship is depicted in FIG. 3A and FIG. 3B Referring to FIG. 3A, a torque versus efficiency map for an exemplary motor operating at a fixed speed (e.g. 6000 rpms) is illustrated. In the exemplary map, a range of torque outputs from 0.0 Nm to 250 Nm is plotted along the horizontal axis, while the efficiency of the motor from 0.0 percent to 100 percent is plotted along the vertical axis. The curve 26 depicts the transition of the motor from zero to peak efficiency torque. During this transition, as depicted by the shaded region 27, the peak efficiency torque has a much lower efficiency at the peak efficiency torque 28.

Referring to FIG. 3B, a map is provided illustrating torque versus work lost for an exemplary motor operating at a fixed speed during a transition from zero to peak efficiency torque. In this map, the work losses (W) are plotted along the vertical axis, while the torque output of the motor is plotted along the horizontal axis. As demonstrated by the curve 29, the work losses of the motor increase as the torque output increases during the transition from zero to peak efficiency torque. Therefore, the faster that transition time from zero to peak efficiency torque, the less work is performed and the less energy is consumed by the motor.

By substituting time in place of torque along the horizontal axis and then integrating the area under the curve 29, the energy consumed by the motor can be calculated for a given transition time. For instance, the Applicant found that with an exemplary motor, 7234.5 Joules of energy was used with a transition time of 0.5 seconds, while only 723.4 Joules of energy were used a transition time of 0.05 second. This comparison demonstrates that the faster the transition time from zero to peak efficiency torque, the lower the energy consumed in losses. It should be noted that with this example, it is assumed that no acceleration of the load has taken place, so no energy has been added to the load inertia.

For different motors, the transition of the motor from zero to peak efficiency torque, the peak efficiency torque and the work losses will all vary. The maps of FIG. 3A and FIG. 3B should therefore be viewed as merely exemplary and should not be construed as limiting in any regard.

Power Converter

Power inventers are known devices that are used with electric motors for converting a DC power supply, such as that produced by a battery or capacitor, into three-phase AC input power applied to motor stator windings. In response, the stator windings generate the RMF as described above.

Figure 4:
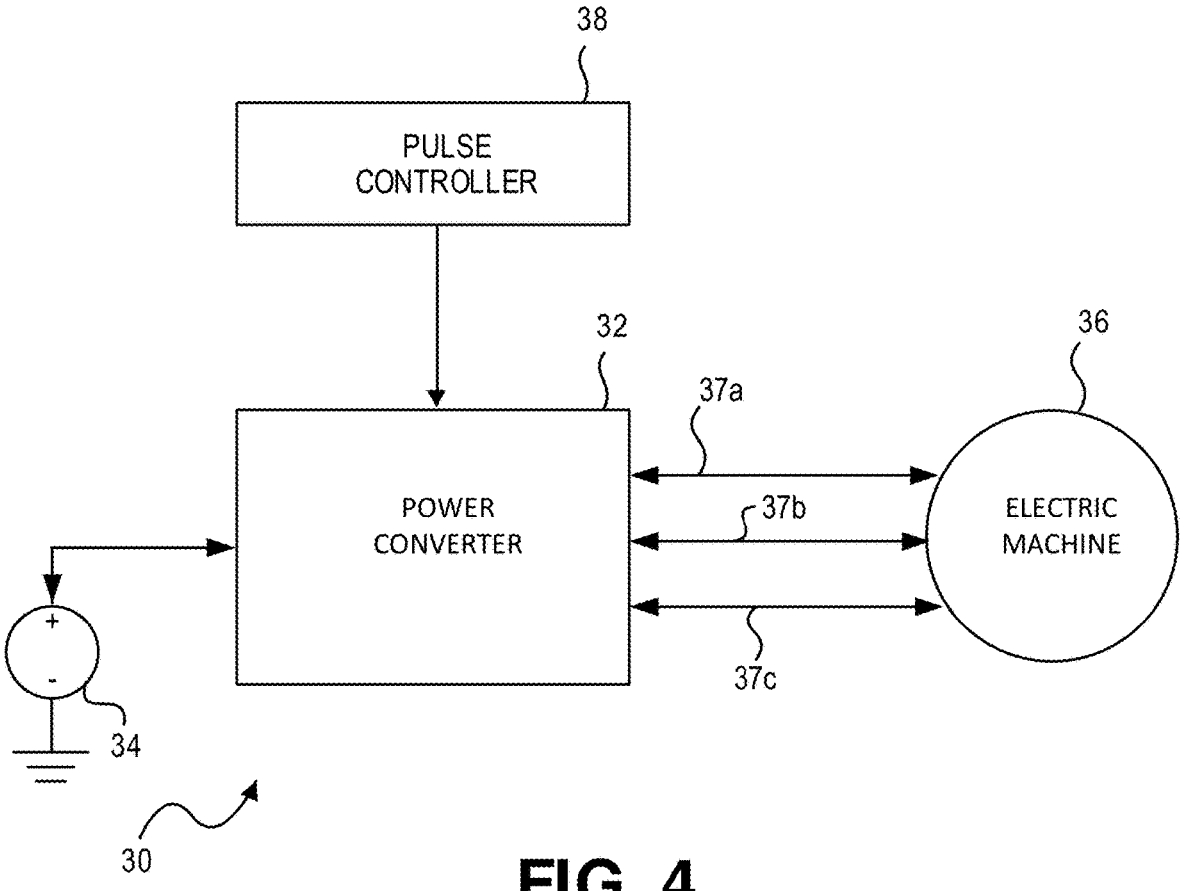
FIG. 4 illustrates a pulsed controlled electric machine in accordance with a non-exclusive embodiment of the present invention.

Referring to FIG. 4, a diagram of a power controller 30 for pulsed operation of an electric machine is illustrated. The power controller 30 includes a power converter 32, a DC power supply 34, an electric machine 36, and a pulse controller 38. The power converter 32 may be operated as a power inverter or power rectifier depending on the direction of energy flow through the system. When the electric machine is operated as a motor, the power converter 32 is responsible for generating three-phased AC power from the DC power supply 34 to drive the induction machine 36. The three-phased input power, denoted as phase A 37a, phase B 37b, and phase C 37c, is applied to the windings of the stator of the electric machine 36 for generating the RMF as described above. The lines depicting the various phases, 37a, 37b, and 37c are depicted with arrows on both ends indicating that current can flow both from the power converter 32 to the electric machine 36 when the machine is used as a motor and that current can flow from the electric machine 36 to the power converter 32 when the machine is used as a generator. When the electric machine is operating as a generator, the power converter 32 operates as a power rectifier and the AC power coming from the electric machine 36 is converted to DC power being stored in the DC power supply.

The pulse controller 38 is responsible for selectively pulsing the three-phased input power. During conventional (i.e., continuous) operation, the three-phased input power is continuous or not pulsed. On the other hand, during pulsed operation, the three-phased input power is pulsed. Pulsed operation may be implemented, in non-exclusive embodiments, using any of the approaches described herein, such as but not limited to the approaches described with regard to FIG. 5B, FIG. 5C and FIGS. 8 through 14.

Referring to FIG. 5A-5C, plots are provided for illustrating the difference between continuous and pulsed three-phased input power provided to the induction motor 36. In each plot, current is plotted on the vertical axis and time is plotted along the horizontal axis.

FIG. 5A illustrates conventional sinusoidal three-phased input current 42a, 42b, and 42c delivered to the induction machine 36. Phase B, denoted by curve 42b lags phase A, denoted by 42a by 120 degrees. Phase C, denoted by curve 42c, lags phase B by 120 degrees. The sine wave period is τ. The three-phased input current 42a, 42b, and 42c is continuous (not pulsed) and has a designated maximum amplitude of approximately 50 amps. It should be appreciated that 50 amps is only a representative maximum current and the maximum current may have any value.

FIG. 5B and FIG. 5C illustrate two examples of different pulsed three-phased current waveforms 44a, 44b, and 44c and 46a, 46b, and 46c that each has a 50% duty cycle and peak amplitude of approximately 100 amps. As in FIG. 5A the period of the base sine wave is τ, however, now the sine wave is modulated on and off. The delivered current in FIG. 5B and FIG. 5C delivers the same average torque as the continuously applied three-phased input current of FIG. 5A (assuming torque is proportional to current, which is often the case). The difference between pulsed currents 44a-c and 46a-c is the duration of their respective current pulses and the interleaved "off" periods. In FIG. 5B, the current pulses 44a-c are interleaved with "off" periods of equal length. The length of each on and off period is 2 τ. In FIG. 5C, the current pulses 46a-c and the interleaved "off" periods again have equal duration. In this case the duration is τ/2. In both examples, the duty cycle is 50%. However, the duration of the "on" and "off" time durations is different, i.e. the frequency of the pulsed modulation is different. The frequency of the pulsed modulation may vary based on the type of electrical machine used, noise and vibration considerations, current operating rotor speed, and other factors.

FIG. 5B and FIG. 5C illustrate applications in which the "on" motor drive pulses are evenly spaced while the motor is operated at a steady state desired output level. Such an approach works well in many circumstances but is not a requirement. The duty cycle need not be 50% but can be adjusted to match the desired average output torque. In FIG. 5B and FIG. 5C the phase of the on/off pulses is synchronized with the applied AC power; however, the phase of the on/off pulses need not be synchronized with the phase of the applied AC power in some embodiments. Thus, the relative sizes and/or timing of the motor drive pulses can be varied as long as they average out to deliver the desired average torque.

Motor Physics and Constraints

With any given motor, physics ultimately limits how fast a zero to peak efficiency torque transition can be. In general, the transition speed is based on the physics of how fast the electric fields can be built up in the motor, which in turn, are limited by the applied voltage, electric motor back emf ("BEMF") and the inductance of the motor windings.

If we assume that the set point of the power converter 32 is incremented at time zero and the feedback is zero, then the control to the output stages of each phase will be saturated. As a result, either the low or high output power devices for each motor phase will be turned on hard. This results in six possible combinations, including:

1. Phase A and B positive with phase C negative,
2. Phase A positive with phase B and C negative,
3. Phase B and C positive with phase A negative,
4. Phase B positive with phase A and C negative,
5. Phase C and A positive with phase B negative, and
6. Phase C positive with phase A and B negative.

With each of these six possible combinations, the current flow in the motor 36 at time zero will be (a) the full current in one phase and (b) while the other two phases split the current. The ratio of these currents will depend, as further described below, by the rotor position at time zero.

Figure 6A:
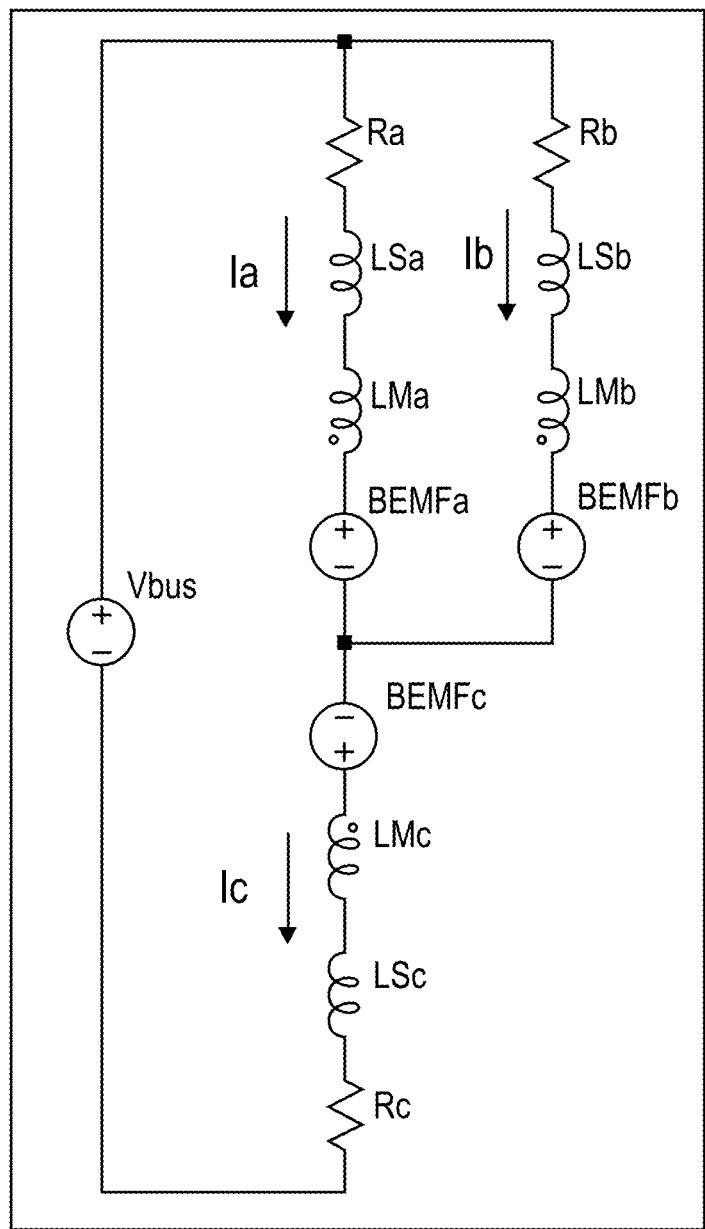
FIG. 6A and FIG. 6B are representative circuits modeling the current flows through the three phases A, B and C of an exemplary motor.

Referring to FIG. 6A, a representative circuit modeling the current flows through the three phases A, B and C is shown.

Each phase A, B and C is represented by its self inductance ("LS"), it mutual inductance ("LM"), its resistance ("R") and its BEMF.

Figure 6B:
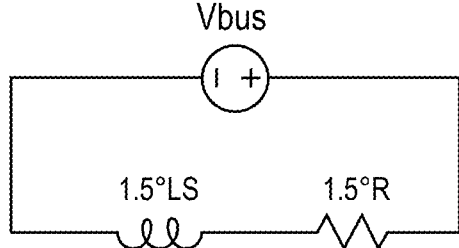

In the case shown, Ic=Ia+Ib. The sum of the currents flowing in the mutual inductance is zero, and therefore, the mutual inductance has no effect on the current flow. The resulting reduced equivalent circuit assuming the BEMF of the motor is zero as illustrated in FIG. 6B. This circuit takes time to build the current to a given value:

$$i = \frac{V}{R}\left(1 - e^{\frac{-Rt}{L}}\right)$$

If the BEMF is not zero, then the applied voltage to each phase will differ. Because the phase impedances and phase currents are balanced, the neutral point of the winding is for this case=Vbus*⅔. If winding B was connected to the negative rail then the neutral voltage would be =Vbus/3. This defines the currents Ia, Ib, and Ic for phases A, B and C as:

$$Ia = \left[Vbus \times \frac{1}{3} - bemfa\right] \times \frac{\left(1 - e^{\frac{-Rt}{L}}\right)}{R} \quad Ib = \left[Vbus \times \frac{1}{3} - bemfb\right] \times \frac{\left(1 - e^{\frac{-Rt}{L}}\right)}{R}$$

$$Ia = \left[Vbus \times \frac{1}{3} - bemfa\right] \times \frac{\left(1 - e^{\frac{-Rt}{L}}\right)}{R} \quad Ib = \left[Vbus \times \frac{1}{3} - bemfb\right] \times \frac{\left(1 - e^{\frac{-Rt}{L}}\right)}{R}$$

$$Ic = \left[Vbus \times \frac{2}{3} - bemfc\right] \times \frac{\left(1 - e^{\frac{-Rt}{L}}\right)}{R}$$

As all the values above are the instantaneous, the values at time zero are dependent upon the instantaneous value of the BEMF of each phase, which in turn is dependent upon the location of the rotor within one electrical cycle or pole pair pitch. It must also be noted that as time progresses, so does the instantaneous BEMF voltage per phase, the voltage applied to the motor inductance and the rate of rise of the motor phase current.

The intent is for the current to reach its desired value and phase to provide the demanded torque. The current is normally controlled using Field Oriented Control or "FOC", and hence, the phase currents are transposed to the rotating frame values of "iq" (quadrature current) and "id" (direct current) where the vector sum of id and iq equals the peak magnitude of the phase current and ArcTan id/iq is the angle. The cosine of the angle is the power factor. So deducing the values of id and iq using the Direct Quadrature Zero transform gives:

$$id = Vbus * \left[\frac{Cos\phi}{3} + \frac{sin\phi}{\sqrt{3}}\right] \times \frac{\left(1 - e^{\frac{-Rt}{L}}\right)}{R}$$

$$iq = \left\{Vbus * \left[\frac{Cos\phi}{\sqrt{3}} - \frac{sin\phi}{3}\right] + Vpk\right\} \times \frac{\left(1 - e^{\frac{-Rt}{L}}\right)}{R}$$

When inspecting the above formulae, the BEMF waveform Vpk only influences iq (quadrature current), both are influenced by the bus voltage, Vbus, and the angular position of the rotor, $\ominus$. Neither the angle nor the motor BEMF can be changed without a change of motor so the only parameter that can be controlled to affect the rate of rise of the phase currents, and hence the motor torque, is the applied bus voltage, Vbus. One aspect of this invention, therefore, proposes that the bus voltage be temporarily increased or "boosted" to a higher value than the normal operating bus voltage for the duration of transit time from zero to the peak efficiency torque during pulsing, thereby reducing that transit time.

It should be noted that when the converter is turned off the energy stored in the electric motor windings is returned to the bus voltage supply. If the supply cannot absorb this energy, then the bus voltage will rise as the bus capacitance absorbs this energy. Due to the amount of capacitance across the bus supply, this normal process will typically only increase the bus voltage by a small percentage, generally not enough to be considered as boosting the bus voltage. However, if this energy is captured independently, for example captured and stored in a storage device such as a capacitor or battery, then it could be recycled back to the motor in the form of a boost voltage.

Alternatively, during the "OFF" period the bus voltage could be augmented by a separate boost voltage source using a charge pump or separate voltage source. This boost supply should not be designed to charge the main bus capacitance but a separate capacitance that can be discharged into the motor over the on-transition time from zero to the demanded torque.

Conventional Power Converter Circuit

The inherent inductance of the motor can thus transitorily delay/slow the voltage/power steps between the on and off motor states. During continuous (non-pulsed) operation, these transitory effects tend to have a relatively minimal impact on overall motor operation. However, when rapid pulsing is used as contemplated herein, the transitory effects can have a larger net impact, and therefore, there is an incentive to reduce the leading and falling edge pulse transition times.

Figure 7A:
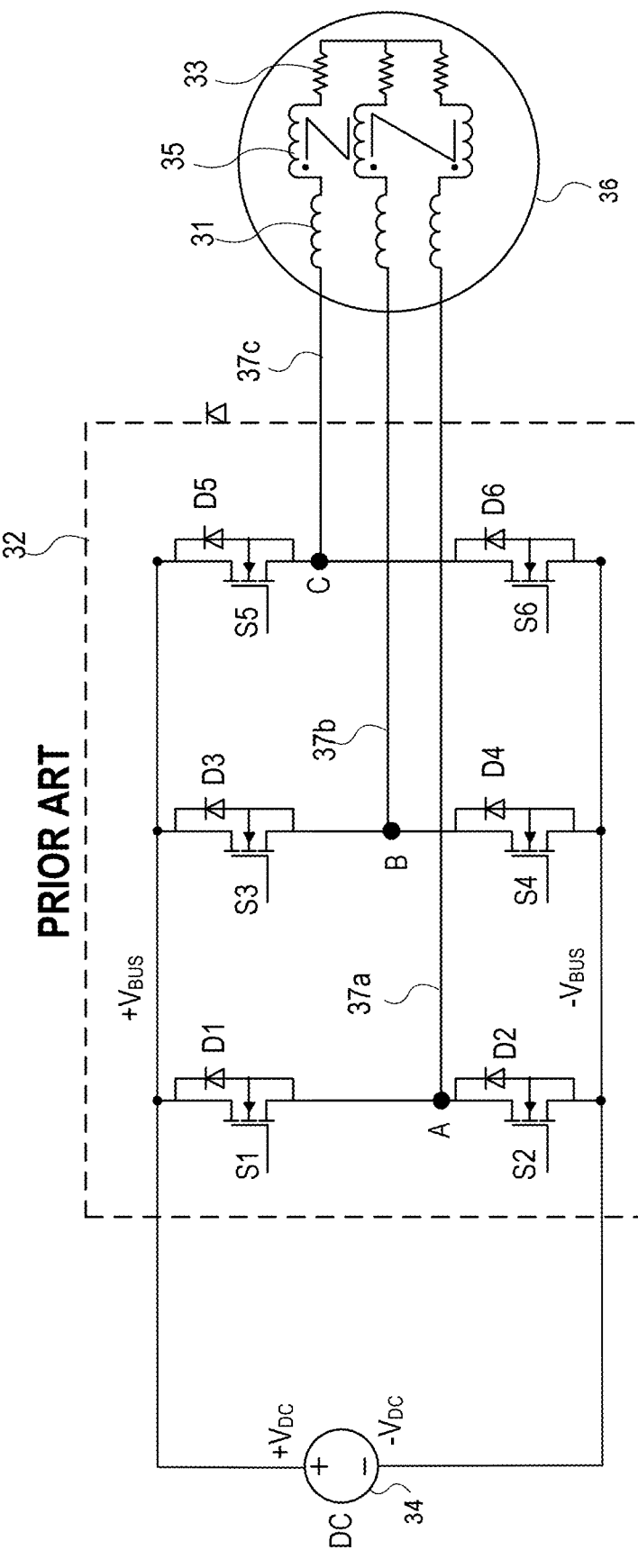
FIG. 7A is a circuit diagram illustrating a prior art power converter.

Referring to FIG. 7A, a circuit diagram of a representative prior art power converter 32 is illustrated. The power converter circuit 32 includes three pairs of switches, denoted as S1 thru S6. Each pair of switches S1-S2, S3-S4, and S5-S6 are connected in series between two voltage buses $(+V_{BUS})$ and $(-V_{BUS})$. The electrical potential between two voltage buses $(+V_{BUS})$ and $(-V_{BUS})$ is the available potential to operate the electric machine 36. Each of the switches, S1-S6, may have a bypass diode (D1-D6) connected electrically in parallel to the switch. These diodes help to prevent switch damaging voltage spikes that may be generated during switch operation.

The diodes also provide a path for recycling current which the switch may block. This is especially important when the electric machine 36 is used as a generator. The switches S1-S6 may be each be a MOSFET (metal-oxide semiconductor field-effect transistor) switch with integrated diodes. Alternatively, other types of transistors, such as, but not limited to, insulated gate bipolar transistors (IGBT) may be used.

A connection to a stator coil winding of the electric machine 36 is made between each switch pair. For phase A, the connection is between switch pair S1-S2 and is designated as 37*a*. For phase B, the connection is between switch pair S3-S4 and is designated as 37*b*. For phase C, the connection is between switch pair S5-S6 and is designated as 37*c*.

Within the electric machine 36, each phase stator winding may be modeled as an inductor 31, a resistor 33, and a mutual inductance 35. These elements are only labeled in FIG. 7A for phase C, but analogous elements are present in the phase A and phase B windings.

The switches S1-S6 may be collectively referred to as a switching network that controls power to and from the electric machine 36.

When the electric machine 36 is operated as a motor, the switches S1-S6 operate in a conventional manner to apply current to each of the stator windings. For example, the switches may be operated as a six-step inverter, which provides AC power to the electric machine 36.

Figures 7B, 7C, 7D, 7E, 7F:
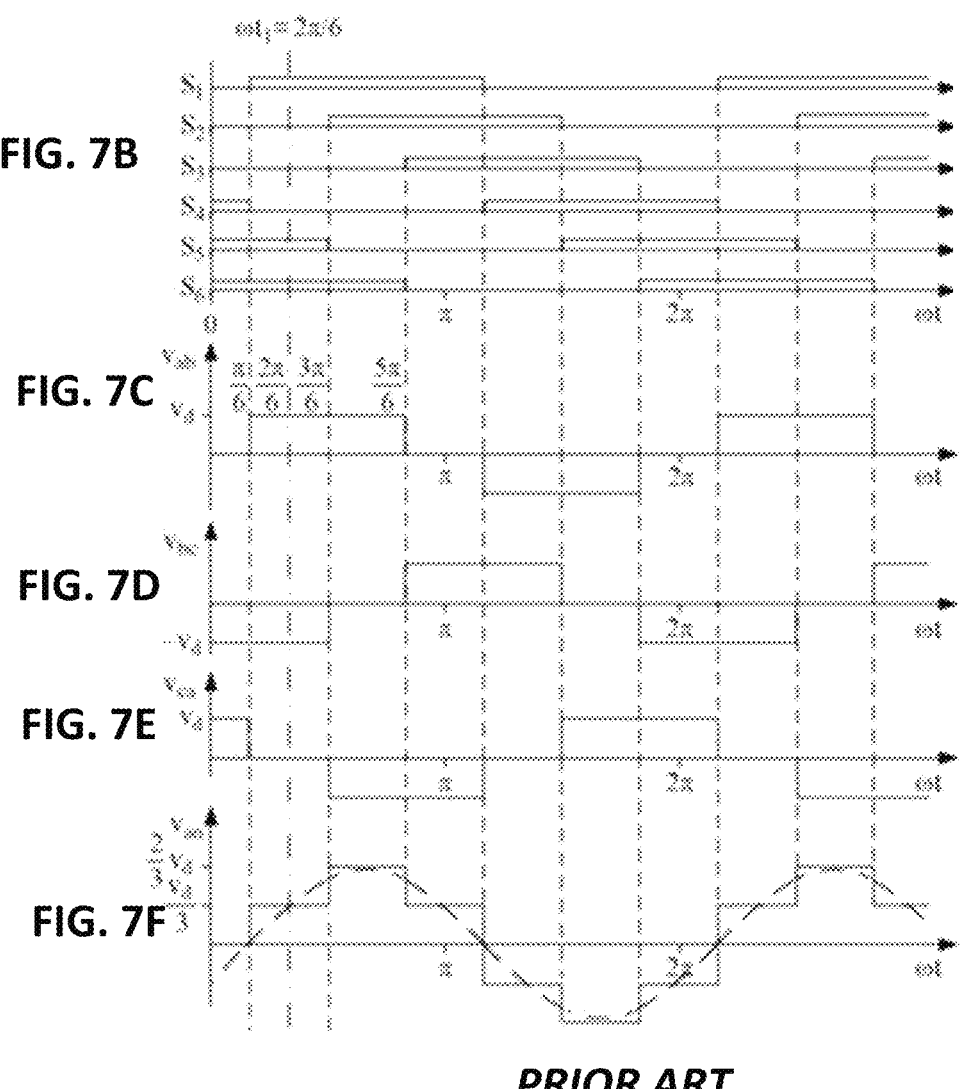
FIG. 7B-7F are exemplary prior art timing diagrams showing switching states and voltages for the power converter shown in FIG. 5A.

FIG. 7B shows the switching sequence to obtain a six-step output from the power converter 32. Each switch is open for ½ of a cycle period in a staggered manner. For each winding, current can flow through one switch on the top row and one or two switches on the bottom row. The switch pairs, S1-S2, S3-S4, and S5-S6 are never simultaneously turned on as this would short out the DC power supply 34.

FIG. 7C shows the voltage between points A and B as voltage $V_{ab}$.

Similarly, FIG. 7D and FIG. 7E show the voltage between points B and C and C and A, respectively. Summing these voltages allows the voltage between each phase and neutral to be determined.

FIG. 7F shows the resultant phase voltage for phase A. The resultant 6-step waveform approximates a sine wave with a frequency, ω, and is commonly referred to as the modulation signal. The phase voltage for phase B and C are shifted in phase by 120° and 240°, respectively, relative to the phase A voltage.

It should be appreciated that electric machine 36 may be operated as a generator as well as a motor. When operating as a generator, the energy flow is from the electric machine

36 to the DC supply 34. The power converter 32 acts as a 3-phase rectifier rather than an inverter.

In typical prior art systems, the switching network is used to control the power flowing to the electric motor by pulse width modulation (PWM) control. PWM control reduces the time that the switching network is in an active configuration of the switches S1-S6 where power can flow to the electric motor. That is, the fraction of time that the switches S1-S6 are in an inactive configuration, either S1, S3, and S5 or S2, S4, and S6 are all turned off, increases as the desired electric motor torque output decreases.

Power Converter with Boost

Figure 8:
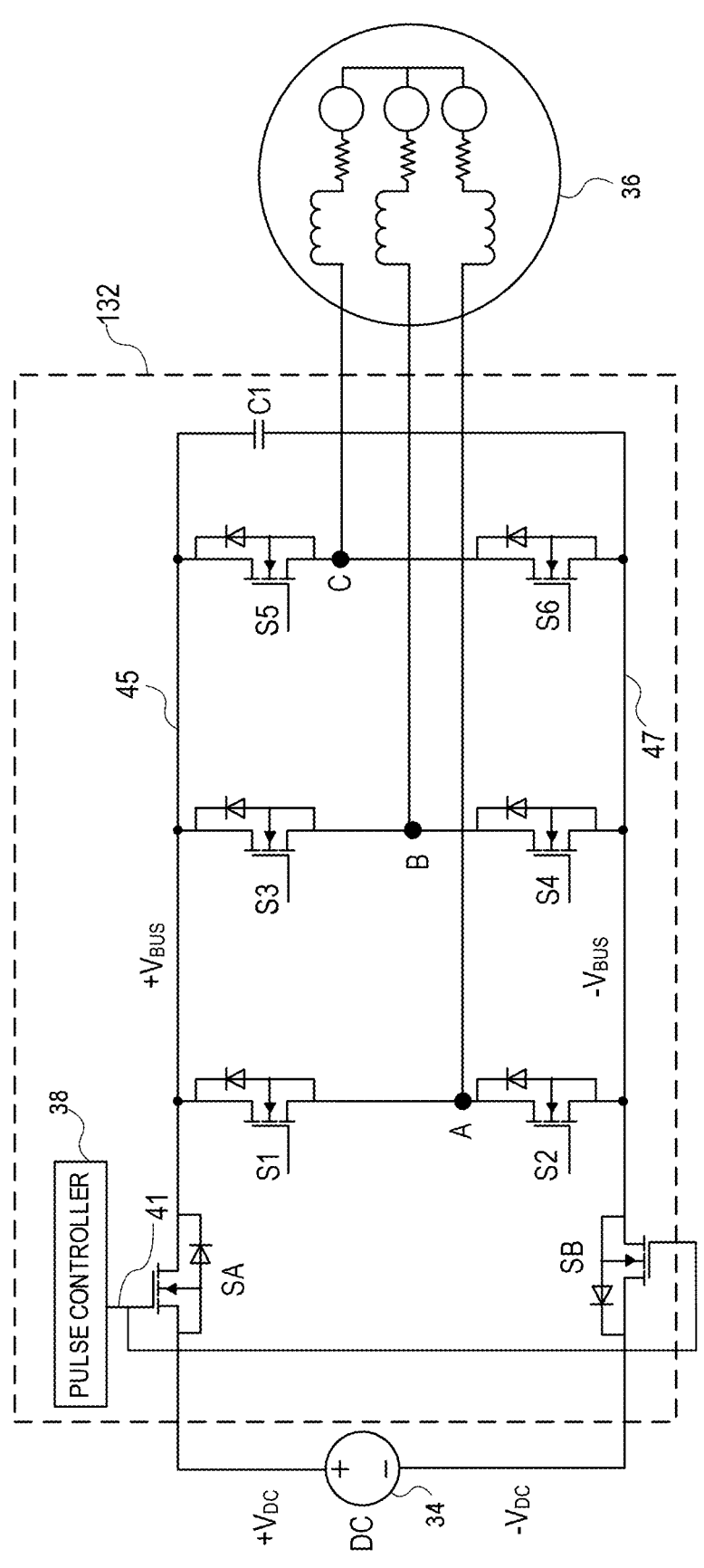
FIG. 8 is a power converter including a boost circuit in accordance with a non-exclusive embodiment of the present invention.

FIG. 8 shows a power converter circuit 132 including a boost circuit according to a non-exclusive embodiment of the current invention. As compared to the prior art power converter circuit 32 shown in FIG. 7A, power converter circuit 132 also includes additional switches SA and SB, which are each controlled by a pulse controller 38. They may be controlled by a common signal line 41 (as shown in FIG. 8) or they may have independent control lines (not shown in FIG. 8). When switch SA is turned on, the positive power supply voltage $(+V_{DC})$ is coupled to $(+V_{BUS})$. When switch SB is turned on, the negative power supply voltage $(-V_{DC})$ is coupled to $(-V_{BUS})$.

During operation, the pulse controller 38 operates to selectively turn switches SA or SB on and off by applying a pulsed waveform to signal line 41, which electrically connects pulsed controller 38 to switches SA and SB. When switch SA and SB are turned on, current may be delivered to the electric machine 36. Conversely, when SA and/or SB are turned off, no current, or only a transient current, is delivered to the electric machine 36.

The power converter circuit 132 also includes a capacitor C1, which has one conductive plate coupled to $(+V_{BUS})$ and the other conductive plate coupled to $(-V_{BUS})$. Collectively the switches SA and SB and the capacitor C1 may be referred to as a boost circuit, since their purpose is to increase the initial voltage on the $+V_{BUS}$ and $-V_{BUS}$ buses at the beginning of an "on" pulse as described below. In various embodiments, boost circuit may be incorporated into the switching network or may include elements distinct from the switching network.

As previously noted, the goal of pulsed motor control is to operate the electric machine 36 at substantially its most efficient level for the current machine speed during "on" periods and to cut-off power (provide zero or negligible power) during the "off" periods. For example, the power supplied during the off periods may be less than 10%, 5%, 1%, 0.5%, or 0.1% of the power supplied during the "on" period. The operating point while operating during the "on" period may have an efficiency within 5%, 2%, or 1% of a maximum operating efficiency point of the motor at the current motor speed. The transitions thru the low efficiency operating region between the "off" and "on" periods should be as fast as possible to maximize efficiency. Thus, the power transitions between the machine power "on" and "off" states ideally have a leading edge that transitions vertically straight up and a following edge that vertically transitions straight down. Such "perfect" pulses 60 are diagrammatically illustrated in FIG. 9A, which illustrates the ideal motor drive current versus time for pulsed control having a duty cycle of 50%. In this figure, the current pulse represents the sum of the current in all the phases. While the current pulse is shown as flat topped, this will not necessarily be the case.

In the real-world, a number of practical limitations make generation of such perfect pulses difficult to achieve. For instance, inductive aspects of both the electric machine 36 and the power converter 32 circuitry slow down the current rise and fall times. The actual response of a particular machine will vary with the electrical characteristics of the electric machine 36, the rotational speed of the electric machine and the available bus voltages. In general, the actual rise and fall of pulses occur more gradually, meaning the transitions occur over time. The nature of the rise and fall in the real-world is diagrammatically illustrated in FIG. 9B. As seen therein, there is a ramp-up period (rise time) 62 required for the current to actually rise from zero to the desired "on" power level and a ramp-down period (fall time) 64 required for the current to actually fall from the "on" power level down to zero.

During the power ramp-up and ramp-down periods, the electric machine 36 continues to consume or generate power. However, the machine operates less efficiently during these transition periods. In general, the machine efficiency will drop as the operating current drops from its maximum efficiency condition (curve 16 FIG. 1) towards zero, with the energy conversion efficiency getting noticeably worse as the current level approaches zero. Thus, the pulse distortion represented by the current ramp-up and ramp-down periods detract from efficiency gains resulting from pulsed operation. In general, the smaller the ratio of the rise/fall times to the pulse length, the less the transitory switching effects impact the machine's energy conversion efficiency during pulsing.

Figures 9A, 9B, 9C:
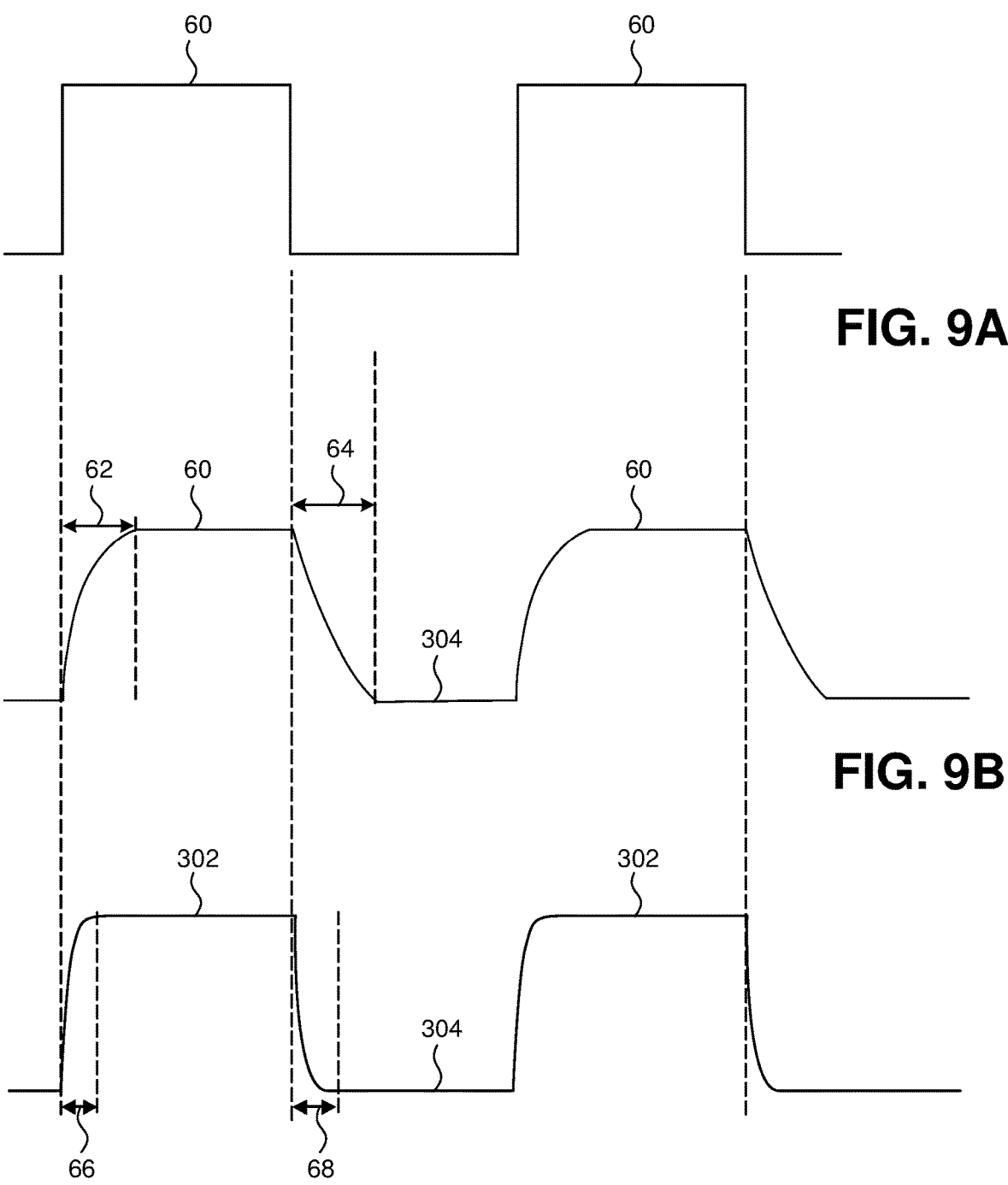
FIGS. 9A-9C are signal diagrams illustrating how the boost circuit improves rise and fall times during pulse-controlled operation of the power converter in accordance with a non-exclusive embodiment of the invention.

It should be appreciated that the transitory effects shown in FIG. 9B are illustrative in nature and do not necessarily reflect actual rise/fall times associated with operation of any particular electric machine. The relative scale of the rise time to the pulse length ratio can vary widely based on the characteristics of the machine used (which primarily dictates the rise and fall times), the frequency of the pulsing (which is primarily dictated by the control scheme used) and the pulse width (which is dictated by the control scheme and machine load). The voltage available to power the electric machine and machine rotation speed will also impact the pulse rise and fall times. If the pulsing is slow compared to the machine response, the rise/fall times may be a small fraction of the pulse width and the transitory switching effects may have a minimal impact on machine performance. Conversely, if the pulsing is very rapid and/or the machine response is low, the rise/fall times may be a significant fraction of the pulse width and can even exceed the pulse width in some situations. If not managed carefully, the transitory efficiency losses associated with switching can significantly reduce or even eliminate any theoretical gains that can be attained by pulsed operation. Thus, it is important to consider the transitory switching effects associated with pulsed operation when determining the pulsing frequency and control schemes that are appropriate for any particular application.

The capacitor C1 included in the power converter circuit 132 of FIG. 8 is provided to improve the current rise and fall times. The capacitor C1 may store energy from the electric machine 36 during the ramp-down period and supply energy to the electric machine 36 during the ramp-up period. This results in faster turn-on and turn-off transitions than would occur without the capacitor C1.

To better understand operation of the power converter 132, assume the power converter 132 is initially in an "on" state and the electric machine 36 is operating as a motor. This implies that, the switches SA and SB are turned on so that current can flow from the positive terminal of the DC supply 34 thru the power converter 132 to the electric machine 36 and return to the negative terminal of the DC supply 34. The switches S1 thru S6 will oscillate in the configurations shown in FIG. 7B to apply AC power to the electric machine 36.

To terminate motor operation the switches SA and SB may be turned off, allowing the $+V_{BUS}$ and $-V_{BUS}$ buses to have a different potential than their respective terminals of the DC power source 34. Since the circuit is now open, current must cease to flow thru the circuit; however, there may be significant energy associated with current generated magnetic fields in the electric machine 36. At least some of this energy may be extracted from the electric machine 36 and is captured in capacitor C1 where it is stored. This will increase the electrical potential difference between the positive voltage bus and negative voltage bus. For example, the potential on line $+V_{BUS}$ may increase above that of the positive terminal of the DC power source, $+V_{DC}$, and the potential on line $-V_{BUS}$ may decrease below that of the negative terminal of the DC power source, $-V_{DC}$. Note that the switches S1-S6 all have bypass diodes, which allow unidirectional current to flow from the electric machine 36 to the $+V_{BUS}$ line and from the $-V_{BUS}$ line to the electric machine 36 independent of the switch position. Coincident with, or nearly coincident with, the turning off of switches SA and SB any of the switches S1-S6 that may have been turned on when switches SA and SB opened are turned off, so that current does not flow through any of these switches between the $+V_{BUS}$ and $-V_{BUS}$ lines to the electric machine 36.

When motor operation is once again desired, the switches S1-S6 may be turned on in one of the patterns shown in FIG. 7B. The switching pattern must correspond to the rotor rotation angle so that the phase of the applied current matches the correct phasing to once again supply power to the electric machine 36. Switches SA and SB are closed when the voltage on the $+V_{BUS}$ drops to $+V_{DC}$ and $-V_{BUS}$ rises to $-V_{DC}$, respectively. This circuit configuration and control method is arranged to provide a higher initial voltage to be applied to the electric machine 36 at the start of the "on" phase, which advantageously reduces the pulse rise time.

Figure 10:
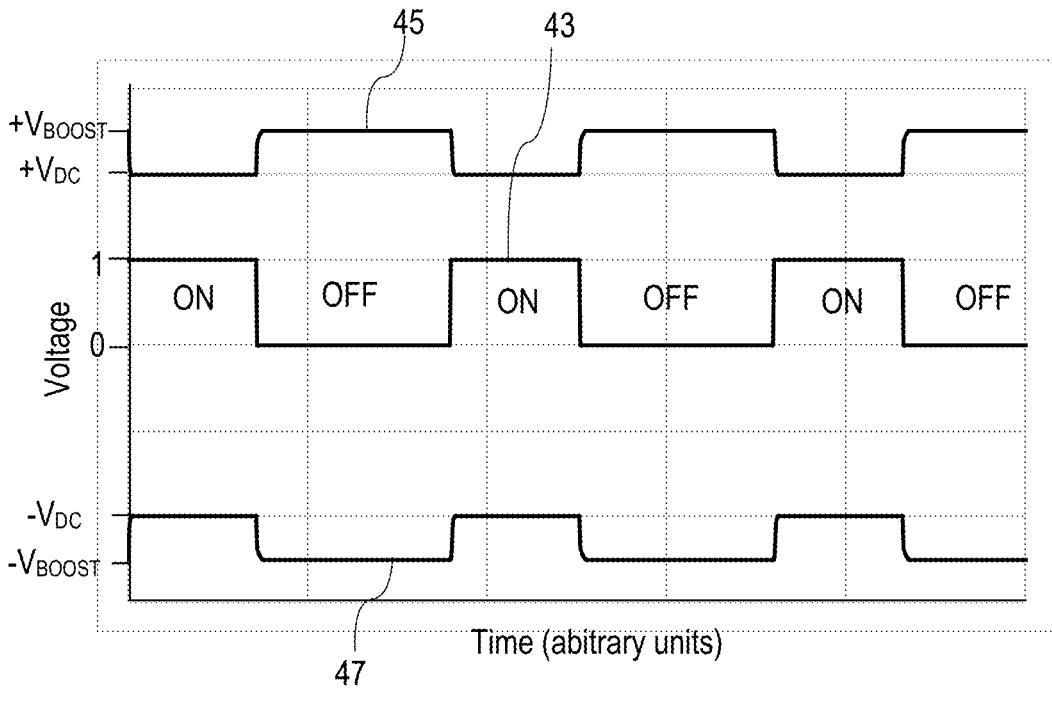
FIG. 10 illustrates exemplary voltages available to drive an electric machine as a function of time in accordance with a non-exclusive embodiment of the invention.

FIG. 10 illustrates exemplary $+V_{BUS}$ and $-V_{BUS}$ waveforms versus time for the circuit shown in FIG. 8. The pulse generator 38 generates a digital waveform 43 consisting of a string of digital "0's" and "1's". The 1's may correspond to the electric machine 36 being turned "on" and the 0's may correspond to the electric machine being turned "off". In FIG. 10, the electric machine 36 is being pulsed at a 40% duty cycle; however, this is exemplary only and any duty cycle may be used. The voltage 45 on the $+V_{BUS}$ rail increases to $+V_{BOOST}$ during the ramp-down period and the voltage 47 on the $-V_{BUS}$ rail drops to $-V_{BOOST}$ during the ramp-down period. The magnitude of the voltage change on the $+V_{BUS}$ and $-V_{BUS}$ buses may be equal or different. The $+V_{BUS}$ voltage 45 and $-V_{BUS}$ voltage 47 remain relatively constant during the motor off time as the energy from the motor ramp-down is stored in capacitor C1. When the pulse generator waveform 43 returns to a digital "1", the energy stored in capacitor C1 is supplied to the electric machine 36 thru the switch array S1-S6. This causes the voltage 45 on the $+V_{BUS}$ rail to return to $+V_{DC}$ and the voltage 47 on the $-V_{BUS}$ rail to return to $-V_{DC}$ as the charge in capacitor C1 is dissipated and the energy stored in capacitor C1 is used to drive the motor. Motor operation during the "on" period is sustained by turning on switches SA and SB, so that energy from the DC power supply 34 may be used to drive the motor. Effectively the boost circuit increases an available electric potential between the positive voltage bus and the negative voltage bus to drive the electric machine at the beginning of at least one pulse in the series of pulses. It should be appreciated that positive voltage bus and negative voltage bus are relative terms and the electric potential on each of these buses relative to ground potential may be either positive or negative. The boost circuit may be used to increase the available electric potential to drive the electric machine for all pulses in the series of pulses.

While the exemplary power converter with boost circuit is shown in FIG. 8 as having a switch adjacent both the positive and negative terminal of the DC power supply, this is not a requirement. In some embodiments, only a single switch may be required.

The switches SA and SB in conjunction with the capacitor C1 can thus be used to reduce the power rise and fall times, in some cases by factors of 2, 5, 10 or more. The voltage across capacitor C1 can be increased above that of the power supply by storing energy recovered from the motor during its ramp down. The magnitude of the voltage increases with the amount of magnetic energy that can be extracted and captured. This can significantly reduce potential deleterious transitory switching effects associated with pulsed operation.

Examples of improved rise and fall times are schematically shown in FIG. 9C. As evident in the figure, the ramp-up rise time 66 on the pulse leading edge is faster/shorter as compared to the corresponding ramp-up time 62 shown in FIG. 9B. Similarly, the ramp-down time 68 of the pulse trailing edge is faster/shorter as compared to the corresponding ramp-down time 64 shown in FIG. 9B. Therefore, it should be appreciated that electric machines designed with pulsed control in mind or modified to improve the transient response of the machine to power pulses, can benefit even more from pulsed operation than existing machines.

It should be appreciated that the appropriate pulsing frequency implemented by the pulse controller 38 for different machines may be very different based on the machine's construction, operating environment and operational range. For some electric machines, switching frequencies on the order of 10-50 kHz may be appropriate— whereas for other machines much lower switching frequencies, as for example 10-500 Hz range may be more appropriate. The most appropriate pulsing frequency for any particular machine will depend on a wide variety of circumstances, such as the type of machine, the load of the machine, and/or the application of the machine.

It should be appreciated that the details of the boost circuit used to shorten the rise and fall times of the power to or from an electric machine may vary depending on the type of electric machine and its operating regime. For example, in some cases the one of the switches SA or SB can be deleted from the power converter circuit 132. Other types of power converter circuits and control strategies may be used. For example, a Z-source inverter, where a diode, two inductors, and two capacitors are situated between the power supply and switching network may be used in some situations.

The voltage boost level and size of capacitor C1 can be chosen appropriately for the electric machine and its inductive and resistive characteristics to shorten the transient rise/fall times associated with pulsing the machine on and off. Preferably, the respective capacitance and boost voltage levels are also selected to maximize overall machine efficiency during pulsing, including inefficiencies associated with the transients themselves and the effects of any overshoot that may occur due to use of the capacitor C1. Since the capacitor C1 is used to improve transient response, it may be opportunistically recharged in the periods when the motor is not being supplied power—as for example during the electric machine off periods. This mode of operation is explained in more detail in the description below regarding FIG. 11.

Figure 11:
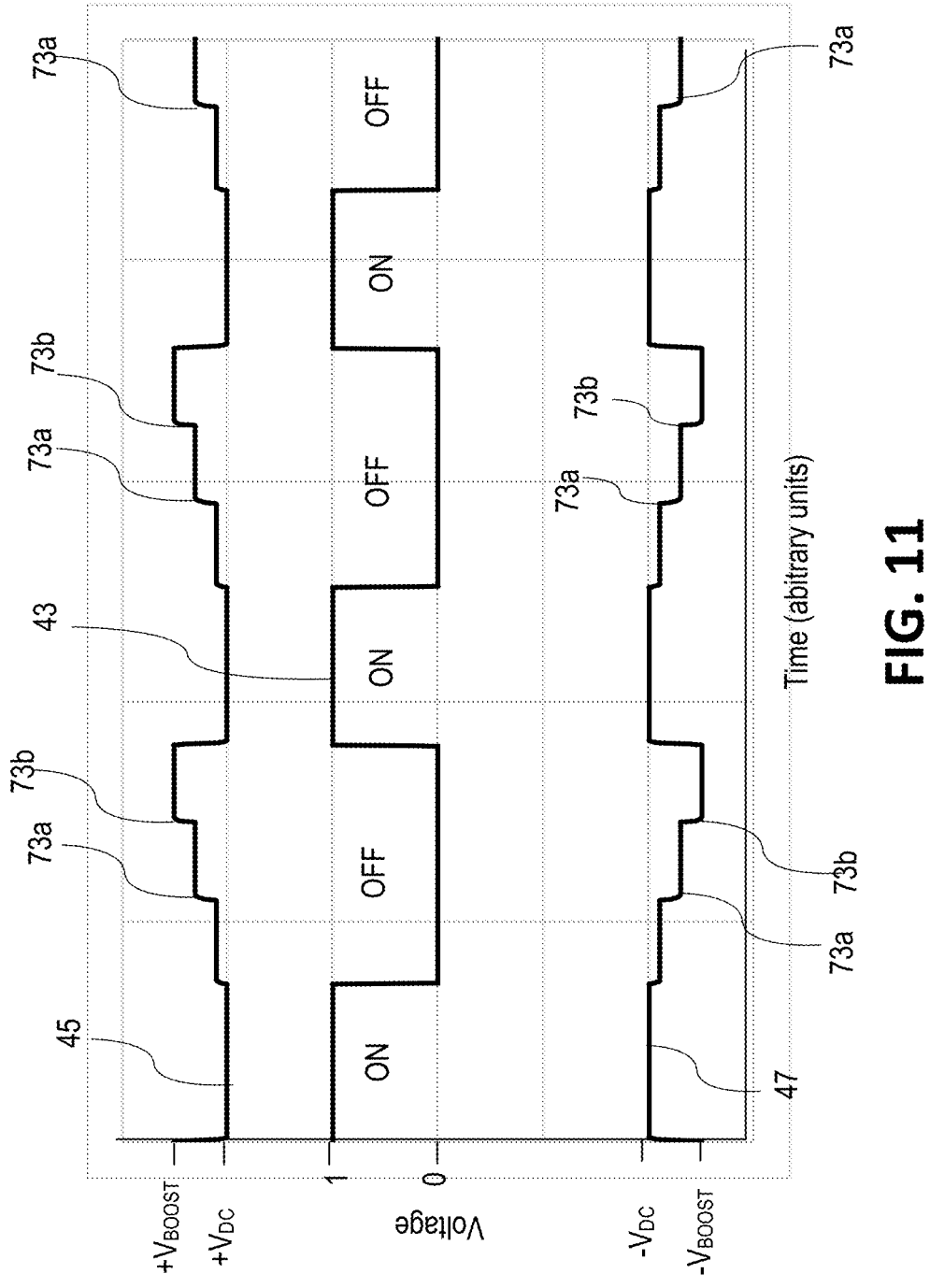
FIG. 11 illustrates exemplary voltages available to drive an electric machine as a function of time in accordance with a non-exclusive embodiment of the invention.

Depending on the motor speed and load there may be insufficient energy stored in the magnetic fields of the motor to adequately boost the $+V_{BUS}$ and $-V_{BUS}$ voltages for sharp rise and fall times. In such cases it may be desirable to boost the potential difference across the electric machine during the off periods between pulses. An exemplary voltage waveform showing two boost cycles 73a and 73b is shown in FIG. 11. It should be appreciated that more or less than two boost cycles may be used depending on the operating conditions of the electric machine. An appropriate switching network and control strategy is required to implement this type of control.

Figure 12:
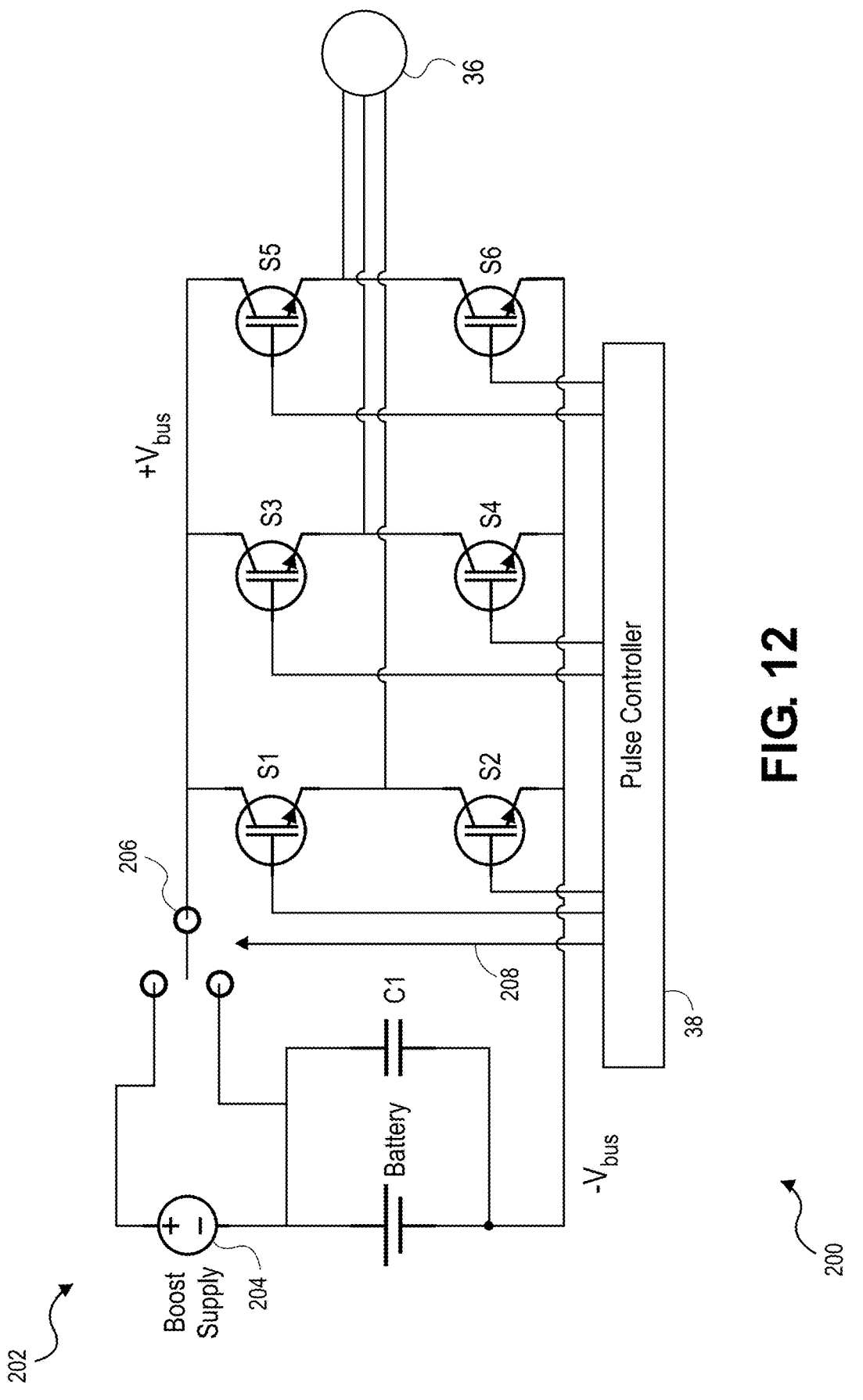
FIG. 12 is another power converter including a boost circuit in accordance with another non-exclusive embodiment of the present invention.

Referring to FIG. 12, another power converter 200 including a boost circuit 202 in accordance with another embodiment of the invention is illustrated. The power converter 200 includes switches S1 and S2 for phase A, switches S3 and S4 for phase B and switches S5 and S6 for phase C. Each pair of switches S1-S2, S3-S4, and S5-S6 are connected in series between two voltage buses ($+V_{BUS}$) and ($-V_{BUS}$). The electrical potential between two voltage buses ($+V_{BUS}$) and ($-V_{BUS}$) is the available potential to operate the electric machine 36. The switches S1-S6 are collectively referred to as a switching network that controls the power to and from the machine 36. When operating as a motor, power from a DC supply is provided via the switching network of switches S1-S6. In turn, the switching network provides phased energy to the three phases of stator windings of the machine 36 as previously described. Similarly, when operating as a generator, the energy flow is from the machine 36 to a storage device, such as a battery.

The boost circuit 202 includes a boost supply 204, switch 206, a capacitor C1, a battery and a control signal 208 generated by the pulse controller 38. As the pulse controller 38 was previously described, a detailed explanation is not repeated herein for the sake of brevity.

In various embodiments, the boost supply 204 can be a dedicated circuit (e.g., charge pump or separate voltage source) capable of generating a boost voltage and/or a storage device such as another capacitor and/or battery. With the later embodiments, at least some of the energy stored by the storage device may be derived from the motor 38 itself. For example, when the machine 36 is operating as a generator, or when the machine 36 is acting as a motor and transitions from on to off states, such as during pulsing, the produced energy can be diverted to and saved certain components in the boost circuit 202, such the capacitor C1 and/or the battery. The saved energy can then be used to "boost" the positive rail ($+V_{BUS}$) during positive transitions as described below.

The switch 206 can be any type of switch that is capable of switching between the positive (+) and negative (−) electrodes of the boost supply 204. It is anticipated that this switch will be constructed using semiconductor devices. In a specific but non-exclusive embodiment, the switch 206 is a single pull double throw switch.

During continuous motor operation, phased power is provided to the stator windings of the machine 36 via the switches S1 and S2 for phase A, switches S3 and S4 for phase B and switches S5 and S6 for phase C as is well known in the art. The net result is a continuous torque output of the motor as previously described.

During pulsed operation, the pulsed controller 38 controls the switch 206 via the control signal 208 to control the boost circuit 202. With a positive pulse transition, the switch 206 is activated to connect the positive rail $(+V_{BUS})$ to the positive (+) terminal of the boost supply 204. As a result, the boost supply 204, operating in cooperation with the capacitor C1 and battery, act to boost the voltage on the positive rail $(+V_{BUS})$ With the increased or boosted voltage on the positive rail, the transition time is reduced. Once the stored energy in the boost circuit has diminished or the peak torque level has been achieved the control signal 208 directs the switch to connect the positive rail $(+V_{BUS})$ to the negative (−) terminal of the boost supply 204. As a result, the boost voltage is effectively removed from the positive rail $(+V_{BUS})$.

The effect of the boost circuit 202 is also illustrated in FIGS. 9A-9C. In particular, FIG. 9A shows an ideal pulse with no transition time, FIG. 9B shows a "real world" pulse with a transition time designated by reference numeral 62. As previously noted, inductive aspects of both the electric machine 36 and the circuitry of the power converter 200 slow down the current rise and fall times. FIG. 9C shows a transition aided by the boost circuit 202. As can be readily understood by a comparison, the "boosted" transition time 66 as shown in FIG. 9C is significantly smaller (i.e. faster) than the transition time 62 as shown in FIG. 9B.

With the FIG. 12 embodiment, the capacitor C1 is arranged in parallel with each of the switch pairs S1-S2, S3-S4 and S5-S6 between the positive rail $(+V_{BUS})$ and negative rail $(−V_{BUS})$. In a non-exclusive embodiment, the size of C1 is derived from the ripple current of the power converter 200 when acting as an inverter. With this arrangement, the ability of the boost circuit 202 to reduce the rise and fall times of pulses is improved.

Operational Flow Diagrams

Figure 13:
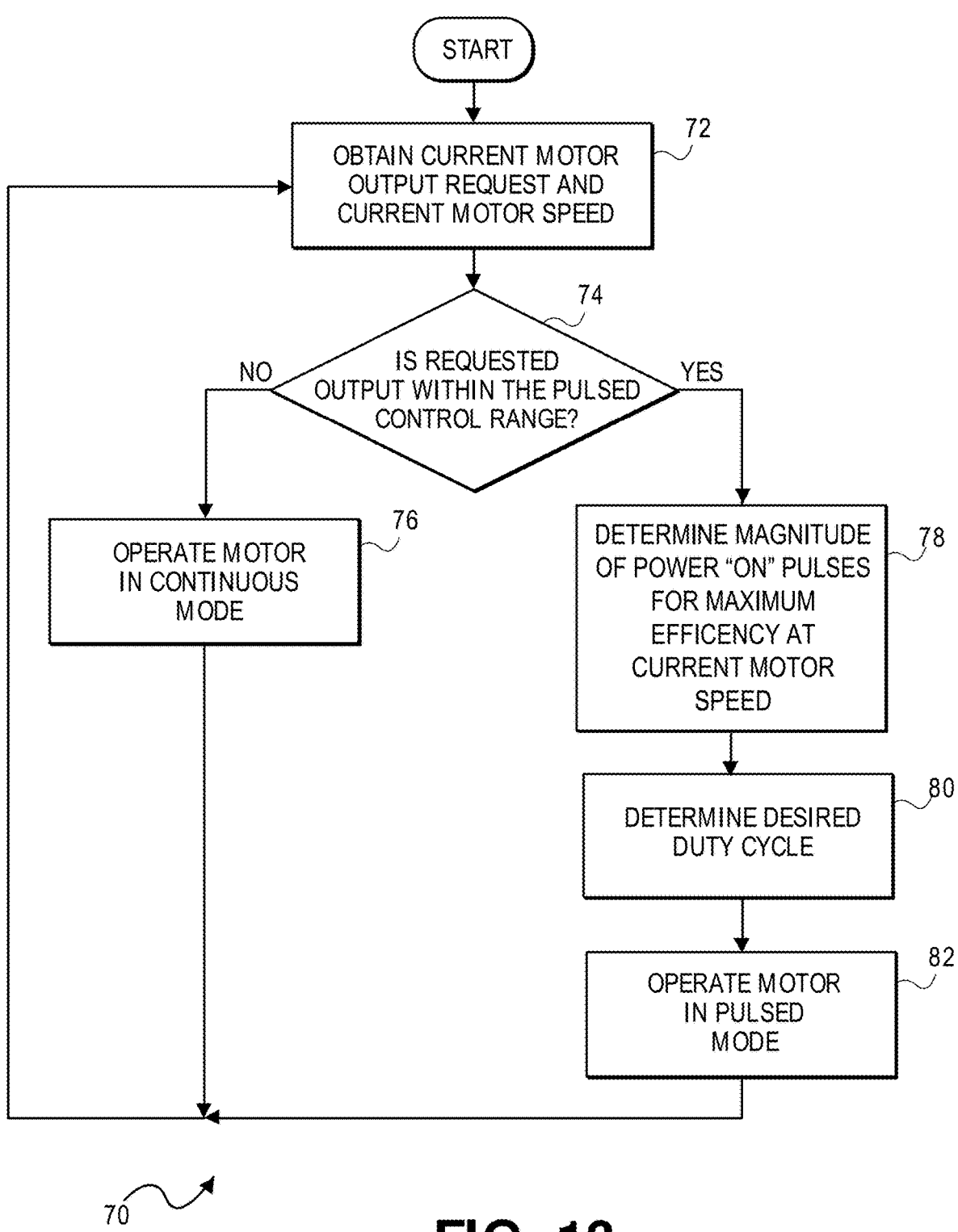
FIG. 13 is a flow diagram illustrating steps for pulsed control operation of an electric machine in a vehicle in accordance with the present invention.

FIG. 13 is a flow diagram 70 illustrating steps for pulsed control operation of an electric motor with characteristics such as those depicted in FIG. 1.

In the initial step 72, the current motor output and current motor speed are ascertained.

In decision step 74, a determination is made based on the current motor output and current motor speed if the motor should be operated in a continuous mode or a pulsed mode. In other words, a determination is made if the desired motor torque is above or below the most efficient output torque for the current motor speed (i.e., the maximum efficiency curve 16 of the motor map illustrated in FIG. 1). If above, the motor is operated in the continuous mode. If below, the motor may advantageously be operated in the pulsed mode.

In step 76, the motor is operated in the continuous mode 76 if the current motor torque is above the most efficient output torque for the current motor speed.

In step 78, the power output or magnitude of the "on" pulses that provide for substantially maximum efficiency operation at the current motor speed is determined.

In step 80, the desired pulse duty cycle for operation in the pulsed mode is determined so that the average output power or torque matches the desired output.

In step 82, the motor is operated in the pulsed mode using the determined pulse duty cycle and pulsed power output. The use of the power controller 30 with the boosted power converter circuits 132 or some other power converter circuit capable of storing and releasing magnet energy from the electric machine reduces, often significantly, the rise and fall times of the pulses, further improving motor efficiency.

The above steps 72-82 are continuously performed while the motor is in operation. At any particular motor speed, there will be a corresponding most efficient output torque which is diagrammatically illustrated by maximum efficiency curve 16 in FIG. 1. As the instantaneous motor output request and/or current motor speed change, a decision is made to operate the motor in either the continuous or pulsed mode as appropriate. From a conceptual standpoint, when the desired motor torque is below the most efficient output torque for the current motor speed, the overall efficiency of the motor can be improved by pulsing the motor. As a result, for electric motor-powered vehicles the overall efficiency of the vehicle is improved, meaning the vehicle range between battery recharging is extended.

Figure 14:
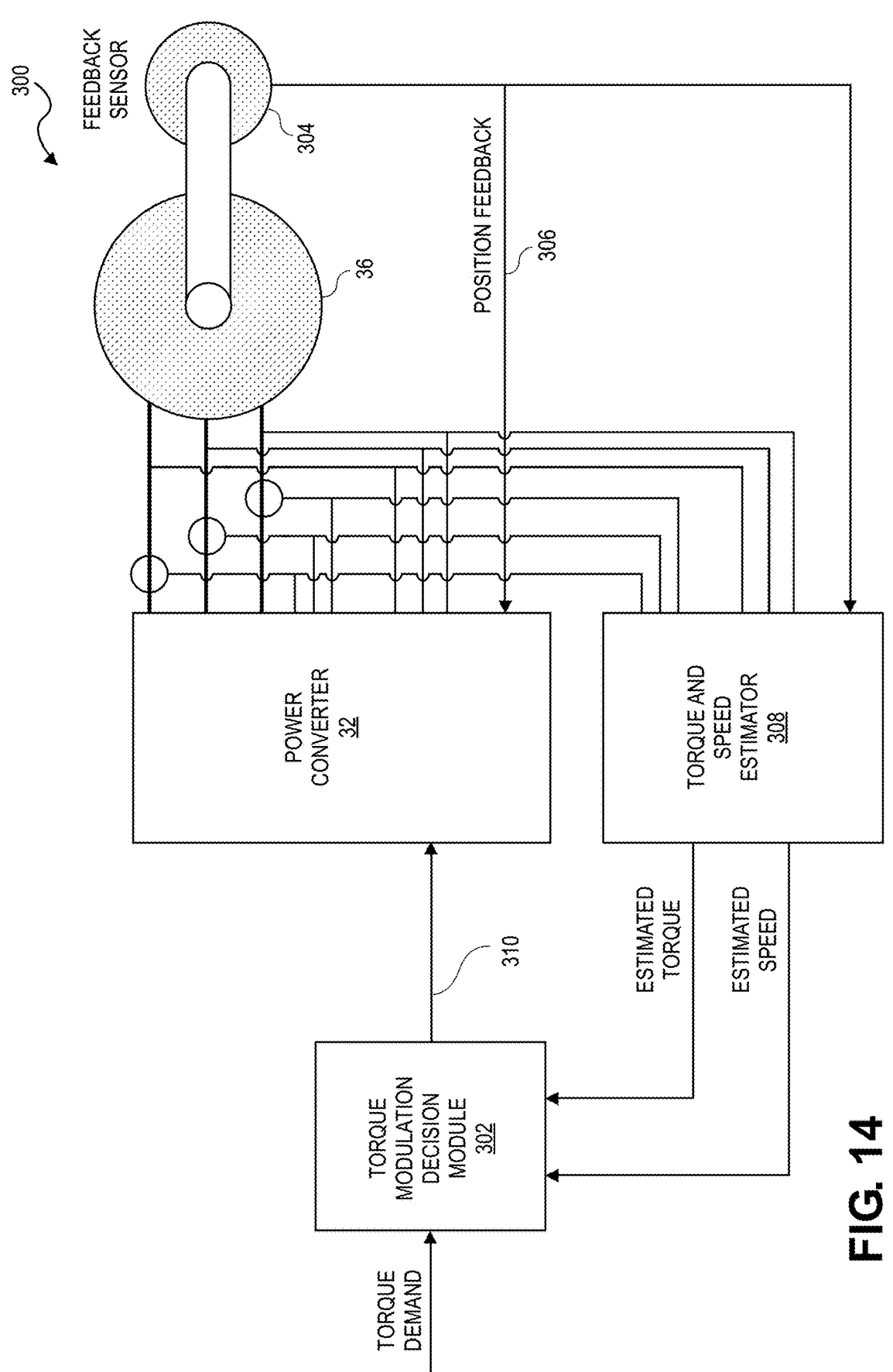
FIG. 14 is a diagram illustrating modulation of energy supplied to a motor in accordance with another embodiment of the invention.

FIG. 14 is a diagram illustrating a system 300 for modulating the energy supplied to a machine 36 in accordance with another non-exclusive embodiment of the invention. The system 300 includes the machine 36, a power converter 32, a torque control decision module 302, a feedback sensor 304 for generating a feedback signal 306 indicative of the angular position of the rotor of the machine 36 and a torque and speed estimator 308.

During operation of the system 300, the torque modulation decision module 302 receives a torque demand. In response, the torque modulation decision module 302 makes a determination if the requested torque is less than the peak efficiency torque of the machine 36 when operating as a motor.

If not, meaning the torque demand is larger than the peak efficiency torque, the machine 36 is operated as a motor in the continuous mode. In which case, the torque demand waveform 310 provided to the power converter 32 is indicative of continuous operation of the machine 36 operating as a motor.

On the other hand if the torque demand is less than the peak efficiency torque of the machine 36, then the machine 36 is operated as a motor in the pulsed mode. In which case, the torque modulation decision module 302 produces a modulated waveform 310 for the power converter 32, causing the machine 36 operating as a motor to switch or pulse between the peak efficiency torque of the motor and a lower torque, the average of which is substantially equal to the demanded torque. In various embodiments, the lower torque can be zero, but it is not necessarily zero. The lower torque can be some other torque value above zero, provided the average of the lower and peak efficiency torque is substantially equal to the demanded torque.

The power converter 32 includes a switching network including pairs of switches S1-S2 for phase A, switches S3-S4 for phase B and switches S5-S6 for phase C, all of which are not shown in the figure for the sake of simplicity. As previously noted, the switches S1-S6 are controlled by the power converter 32 to operate the machine 36 either (1) continuously as a motor resulting in generating a continuous torque output when the torque demand is greater than the peak efficiency torque or (2) in the pulse mode when the torque demand is less than the peak efficiency torque. The power converter 32 can control the energy supplied to the machine 36 using any of a number of different protocols, such as Pulse Width Modulation (PWM), Direct Torque Control (DTC), hysteresis, or "dead beat" control, which is a form of current modulation.

In alternative embodiments, a boosted power converter such as 132 of FIG. 8 or 200 of FIG. 12 may be used. With boosted versions of the power converter 32, efficiency and performance of motor operation of the machine 36 is improved due to the faster rise and/or fall times of pulses during pulsed operation.

The feedback sensor 304 generates the feedback signal 306, which is indicative of the angular position of the rotor of the machine 36. The feedback signal is provided to each of the power converter 32 and the torque and speed estimator 308. With the angular position of the rotor known, the torque and speed estimator 308 can provide accurate estimates of the torque and speed of the motor to the torque modulation decision module 302. In response, the waveform 310 can be adjusted as necessary so that the timing of switching network (i.e., the timing of turning the switches S1-S6 on/off) within the power converter 32 can be precisely controlled so that each of the phases A, B and C of energy are timed to coincide with the current position of the rotor. As a result, the operation of the machine 36 as a motor is both smooth and efficient. It should be noted that the use of a feedback sensor 304 is not mandatory and that other techniques can be used for measuring or estimating the angular position of the rotor of the machine 36. For instance, any of a number of sensorless approaches may be used as well.

Other Motor and Generator Types

There are a wide variety of machines, both electric motor and generator, that are known and commercially available, including both DC and AC motors/generators. Although the structure, control and energy conversion efficiency of the various types of electric motors and generators vary significantly, most electric motors and generators are designed to operate over a range of operating conditions and their energy conversion efficiency will vary over that operating range, often significantly. In general, the control principles described herein can be applied to any type of machine to improve efficiency, provided the operating range includes regions below the equivalent of the maximum efficiency curve 16 illustrated in FIG. 1.

Some prior art motors are currently operated using pulse width modulation (PWM) control. However, such motors are driven without consideration of what might be their most efficient energy conversion level. As such, the described approach can also be used to improve the energy conversion efficiency of such motors as well.

Many types of motors, including brushless DC motors, induction motors, synchronous AC motors, switched reluctance motors, etc. are traditionally driven by a continuous, albeit potentially varying, drive current to deliver the desired torque output. Frequently, the drive current is controlled by controlling the output voltage of an inverter and/or converter (which serves as the voltage input to the motor). Generally, by changing the relative phasing between the rotor and stator magnetic fields a motor can be operated as a generator. Thus, circuits and control methods described in terms of a motor are equally applicable to using an electric machine as a generator. The described pulsed control is particularly beneficial when such motors and generators are operated in regions below their respective maximum energy conversion efficiency points.

Pulsed Motor Control with Vehicles

There is currently widespread interest in using electrical powerplants (e.g., electric motors) in vehicle propulsion systems. Electrics motors used for vehicle propulsion are commonly referred to as traction motors. In the automotive space there have been significant efforts recently to utilize traction motors alone or in combination with internal combustion engines (hybrids) to drive a vehicle. Today, asynchronous motors and three phase induction motors are most commonly used in automotive applications—both of which are good candidates for the described pulsed motor control. Automotive applications are notorious for the very wide range of operating conditions that the motor is expected to operate under—from low speed high torque demands to high speed low torque demands and everything in between. Under most driving conditions (i.e., during the significant majority of many drive cycles), the motor is asked to produce far less torque than it is capable of at the current motor speed—and indeed most driving occurs in regions where the requested output of the motor is below (often significantly below) the maximum efficiency line 16.

In automotive and other vehicle applications, the operational range of the electric motor may be very wide. This is due, in part, to the fact that in most all-electric vehicle applications, the electric motor is coupled to the driven component(s) with a fixed speed ratio. This contrasts with an in internal combustion engine powered vehicle, which typically employ an intermediary transmission having variable speed ratios between the engine and the driven component (s). As can be seen fairly clearly seen in FIG. 1, the "sweet spot" of electric motor operation is often at an intermediate motor speed. When desired, variable gearing can be used to cause the motor to operate in more efficient regions more of the time. Such gearing can readily be provided by a transmission and thus, there are potential advantages to using a transmission in conjunction with the described pulsed motor control. The transmission may have a set of gears or may be continuously variable or may have any other suitable form. In such embodiments, the motor controller or other suitable control component can be arranged to direct operation of the transmission in the desired manner. Again, the use of a transmission can be beneficially employed in a wide variety of other (non-vehicle) related applications as well.

Although automotive applications have been used as an example of a vehicle propulsion application, it should be appreciated that the described control approach is equally beneficial in other propulsion related applications including: electric motors used in other types of vehicles including trucks, carts, motorcycles, bicycles, drones and other flying devices; in robots and other devices that move autonomously within an environment; etc.

The pulse generator or machine controller may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

As suggested above, the period for each cycle during pulsed operation (or inversely the pulsing frequency) may vary widely based on the design needs and the nature of the controlled system ranging from microseconds to tenths of a second or longer. A variety of factors will influence the choice of the cycle period. These include factors such as the capabilities and characteristics of the motor, the transitory effects associated with switching, potential NVH (noise, vibration and harshness) concerns, the expected operational loads, etc. In general, the pulsing frequency selected for any particular application will involve a tradeoff including factors such as NVH considerations, required responsiveness of the electric machine, efficiency loss associated with pulsing, etc. For example, in some automotive applications, pulsing frequencies on the order of 20 Hz-1000 Hz are believed to work well.

As discussed above, transient switching losses associated with switching between motor "on" and motor "off" states during pulsing is another factor that impacts the efficiency of the motor during pulsed operation. As discussed above, one way to reduce these transient switching losses is to improve (shorten) the motor drive current rise and fall times associated with pulsing the motor on and off. Another way to help manage the transient switching losses is to manage the frequency of the pulsing. In general, the lower the switching frequency, the lower the transient switching losses will be. However there is a tradeoff here in that lower frequency switching can sometimes induce noise, vibration and harshness (NVH) that may be undesirable or unacceptable in certain applications. Thus, the pulsing frequency for any particular motor is preferably selected appropriately considering both motor efficiency and NVH concerns and/or requirements that are relevant to the motors intended application(s). Along these lines, it is noted the pulsing controllers that have noise shaping capabilities such as sigma delta conversion based pulsing controllers can be very helpful at mitigating NVH impacts associated with pulsed motor control and can therefore be helpful in supporting the use of generally lower switching frequencies.

It should be appreciated that the appropriate pulsing frequency for different motors may be very different based on the motor's construction, operating environment and operational range. For some motors, switching frequencies on the order of 10-50 kHz may be appropriate—whereas for other motors much lower switching frequencies, as for example 10-500 Hz range may be more appropriate. Still other electric machines may have switching frequencies between these ranges or above or below either of the stated ranges. The most appropriate pulsing frequency for any particular motor will depend on a variety of factors including motor size, on/off transient characteristics, NVH considerations, etc.

The selection of the desire drive point for any particular motor speed can also have an impact on the switching frequency. More specifically, many motors have relatively flat efficiency curves over a relatively broad operational range. In general, pulsed operation at a torque level that is slightly lower than the optimal efficiency point of continuous operation, can sometimes facilitate switching at a slightly lower frequency, which—depending on the nature of the switching losses—may result in a higher overall motor efficiency during pulsed operation. This emphasizes the point that the desired pulsed operation drive point associated with any particular motor speed is not necessarily the torque level that would be most efficient for continuous motor operation. Rather, in some circumstances, the most energy efficient point for pulsed operation may be slightly different than the most energy efficient point for continuous operation. Furthermore, NVH considerations and/or other operational or control considerations may affect the decision as to the drive point that is deemed appropriate for any particular motor speed.

Therefore, the present embodiments should be considered illustrative and not restrictive and the invention is not to be limited to the details given herein but may be modified within the scope and equivalents of the appended claims.

What is claimed is:

1. A vehicle, comprising:
an electric machine configured to propel the vehicle;
a machine controller configured to operate the electric machine in either a continuous mode when a demanded output for the electric machine is above a threshold or in a pulsed mode when the demanded output for the electric machine is below the threshold,
the electric machine configured to operate in the pulsed mode to generate:
(a) a first work output during on pulses; and
(b) a second work output, that is different than the first work output, between the on pulses; and
a boost circuit, coupled to one or more windings of the electric machine, the boost circuit configured to store energy harvested from the one or more windings of the electric machine during ramp-down of the on pulses and then applying the stored energy to the one or more windings of the electric machine during ramp-up of subsequent on pulses,
the applying of the stored energy acting to reduce ramp-up times of the subsequent on pulses relative to not applying the stored energy.

2. The vehicle of claim 1, wherein the boost circuit is further configured to selectively apply the stored energy, harvested from the one or more windings, to a power rail coupled to the electric machine during the ramp up of the subsequent on pulses, the application of the harvested energy acting to "boost" the voltage of the supply rail above a supply rail voltage during the ramp up of the subsequent on pulses.

3. The vehicle of claim 1, wherein the boost circuit includes a capacitor coupled to a power rail for a power converter for the electric machine and a switch that selectively decouples the capacitor from a power supply used to energize the power rail.

4. The vehicle of claim 1, wherein the boost circuit, further includes a switch configured to selectively decouple a storage device from a power supply during the ramp-down of the on pulses so that the energy harvested from the one or more windings of the electric machine is stored in the storage device and not the power supply.

5. The vehicle of claim 1, The vehicle of claim 1, wherein the stored energy that is harvested and applied is electromagnetic energy.

6. The vehicle of claim 1, wherein the electric machine includes a stator and a rotor and the one or more windings is/are a rotor winding(s).

7. The vehicle of claim 1, wherein the machine controller is further configured to select a frequency, a magnitude, and a duty cycle for the on pulses when operating the electric machine in the pulsed mode, the frequency, the magnitude, and the duty cycle selected so that the first work output generated during the on pulses meets the demanded output of the electric machine.

8. The vehicle of claim 1, wherein the threshold is a peak efficiency threshold for the electric machine for a given speed of the vehicle or the electric machine.

9. The vehicle of claim 1, wherein the threshold is derived from a combination of a peak efficiency threshold for the electric machine and Noise, Vibration and Harshness (NVH) considerations.

10. The vehicle of claim 1, further comprising a power converter coupled between a direct current (DC) power supply and the electric machine, the power converter arranged to deliver pulsed power from the DC power supply to the electric machine or vice versa.

11. The vehicle of claim 10, wherein the power converter is operated as a power inverter that converts DC power produced by the DC power supply to AC power for the electric machine when the electric machine is operating as a motor.

12. The vehicle of claim 10, wherein the power converter is operated as a power rectifier that converts an AC power produced by the electric machine to DC power that is stored in the DC power supply when the electric machine is operating as a generator.

13. The vehicle of claim 1, wherein the first work output is larger than the second work output.

14. The vehicle of claim 1, wherein the second work output is substantially zero.

15. The vehicle of claim 1, wherein the vehicle is an electric vehicle (EV) or a hybrid vehicle.

16. A method for operating a vehicle, the method comprising:

receiving a torque demand;

operating an electric machine, used to propel the vehicle, in a pulsed mode when the torque demand is less than a threshold, the electric machine in the pulsed mode generating:

(a) a first work output during on pulses; and (b) a second work output, that is different than the first work output, between the on pulses;

harvesting energy from one or more windings of the electric machine during ramp down of the on pulses respectively;

storing the energy harvested during the ramp down of the on pulses respectively; and applying the harvested energy from storage to the one or more windings during ramp-up of subsequent on pulses respectively, the application of the stored energy acting to reduce ramp-up times of the subsequent on pulses relative to not applying the stored.

17. The method of claim 16, further comprising selectively decoupling a storage device from a power supply during the ramp-down of the on pulses so that the energy harvested from the one or more windings of the electric machine is stored in the storage device and not the power supply.

18. The method of claim 16, further comprising selectively applying the harvested and stored energy to a power rail coupled to the electric machine during the ramp up of the subsequent on pulses, the application of the harvested energy acting to "boost" the voltage of the supply rail above a supply rail voltage.

19. The method of claim 16, further comprising storing the harvested energy by charging a capacitor and applying the stored energy to the one or more windings by discharging the capacitor.

20. The method of claim 16, wherein the one or more windings is/are a rotor winding(s) of the electric machine.

21. The method of claim 16, further comprising selecting a frequency, a magnitude, and a duty cycle for the on pulses when operating the electric machine in the pulsed mode, the frequency, the magnitude, and the duty cycle selected so that the first work output generated during the on pulses meets the torque demand.

22. The method of claim 16, further comprising deciding when the electric machine is to operate in the pulsed mode base on one of the following:

(i) the received torque demand;

(ii) a speed of the electric machine (iii) a speed of the vehicle; or (iv) any combination of (i) through (iii).

23. The method of claim 16, wherein the threshold is derived from one of the following:

(i) a peak efficiency operating range of the electric machine;

(ii) a speed of the electric machine;

(iii) a speed of the vehicle;

(iv) Noise, Vibration and Harshness (NVH) considerations; or (v) any combination of (i) through (iv).

24. The method of claim 16, further comprising operating the electric machine in the pulsed mode when the torque demand is less than the threshold for a given speed of the electric machine or the vehicle.

25. The method of claim 16, further comprising operating the electric machine in a continuous mode when the torque demand is more than the threshold for a given speed of the electric machine or the vehicle.

26. The method of claim 16, further comprising operating a power converter coupled between a direct current (DC) power supply and the electric machine to deliver pulsed power in the pulsed mode from the DC power supply to the one or more windings of the electric machine or vice versa.

27. The method of claim 16, further comprising operating a power converter as a power inverter that converts DC power produced by a DC power supply to AC power for the electric machine when the electric machine is operating as a motor.

28. The method of claim 16, further comprising operating a power converter as a power rectifier that converts AC power produced by the electric machine to DC power that is stored in a DC power supply when the electric machine is operating as a generator.

29. The method of claim 16, wherein the energy that is harvested, stored, and applied is electromagnetic energy.

30. The method of claim 16, wherein the first work output is larger than the second work output.

31. The method of claim 16, wherein the second work output is substantially zero.

32. The method of claim 16, wherein the vehicle is an electric vehicle (EV) or a hybrid vehicle.

\* \* \* \* \*